United States Patent
Schwenger et al.

(10) Patent No.: US 12,492,425 B2
(45) Date of Patent: Dec. 9, 2025

(54) METHODS FOR RNA ANALYSIS

(71) Applicant: CureVac SE, Tübingen (DE)

(72) Inventors: Alexander Schwenger, Tübingen (DE); Stefan Heinz, Tübingen (DE); Tilmann Roos, Tübingen (DE); Benyamin Yazdan Panah, Tübingen (DE); Veronika Wagner, Tübingen (DE)

(73) Assignee: CureVac SE, Tübingen (DE)

( * ) Notice: Subject to any disclaimer, the term of this patent is extended or adjusted under 35 U.S.C. 154(b) by 903 days.

(21) Appl. No.: 17/416,681

(22) PCT Filed: Dec. 20, 2019

(86) PCT No.: PCT/EP2019/086661
§ 371 (c)(1),
(2) Date: Jun. 21, 2021

(87) PCT Pub. No.: WO2020/127959
PCT Pub. Date: Jun. 25, 2020

(65) Prior Publication Data
US 2022/0073962 A1    Mar. 10, 2022

(51) Int. Cl.
*C12Q 1/6806* (2018.01)
*C12Q 1/6813* (2018.01)

(52) U.S. Cl.
CPC ......... *C12Q 1/6806* (2013.01); *C12Q 1/6813* (2013.01); *C12Q 2521/30* (2013.01); *C12Q 2523/107* (2013.01)

(58) Field of Classification Search
None
See application file for complete search history.

(56) References Cited

U.S. PATENT DOCUMENTS

| | | |
|---|---|---|
| 5,594,136 A | 1/1997 | Sessler et al. |
| 2005/0032730 A1 | 2/2005 | von der Mülbe et al. |
| 2005/0059624 A1 | 3/2005 | Hoerr et al. |
| 2005/0250723 A1 | 11/2005 | Hoerr et al. |
| 2006/0188490 A1 | 8/2006 | Hoerr et al. |
| 2007/0259830 A1* | 11/2007 | Karelson ............... A61P 31/00 536/25.32 |
| 2008/0025944 A1 | 1/2008 | Hoerr et al. |
| 2008/0267873 A1 | 10/2008 | Hoerr et al. |
| 2009/0324584 A1 | 12/2009 | Hoerr et al. |
| 2010/0048883 A1 | 2/2010 | Ketterer et al. |
| 2010/0189729 A1 | 7/2010 | Hoerr et al. |
| 2010/0203076 A1 | 8/2010 | Fotin-Mleczek et al. |
| 2010/0291156 A1 | 11/2010 | Barner et al. |
| 2010/0305196 A1 | 12/2010 | Probst et al. |
| 2011/0053829 A1 | 3/2011 | Baumhof et al. |
| 2011/0250225 A1 | 10/2011 | Fotin-Mleczek et al. |
| 2012/0021043 A1 | 1/2012 | Kramps et al. |
| 2012/0258046 A1 | 10/2012 | Mutzke |
| 2013/0129754 A1 | 5/2013 | Thess et al. |
| 2013/0142818 A1 | 6/2013 | Baumhof et al. |
| 2013/0259879 A1 | 10/2013 | Baumhof et al. |
| 2013/0280283 A1 | 10/2013 | Lorenz et al. |
| 2013/0295043 A1 | 11/2013 | Kallen et al. |
| 2013/0336998 A1 | 12/2013 | Kallen et al. |
| 2015/0037326 A1 | 2/2015 | Butler-Ransohoff et al. |
| 2015/0050302 A1 | 2/2015 | Thess |
| 2015/0057340 A1 | 2/2015 | Thess et al. |
| 2015/0093413 A1 | 4/2015 | Thess et al. |
| 2015/0118183 A1 | 4/2015 | Baumhof |
| 2015/0118264 A1 | 4/2015 | Baumhof et al. |
| 2015/0165006 A1 | 6/2015 | Thess et al. |
| 2015/0184195 A1 | 7/2015 | Thess et al. |
| 2015/0218554 A1 | 8/2015 | Thess |
| 2015/0306249 A1 | 10/2015 | Baumhof et al. |
| 2015/0320847 A1 | 11/2015 | Thess et al. |
| 2016/0130345 A1 | 5/2016 | Fotin-Mleczek et al. |
| 2016/0166668 A1 | 6/2016 | Kallen et al. |
| 2016/0166678 A1 | 6/2016 | Kallen et al. |
| 2016/0166710 A1 | 6/2016 | Baumhof |
| 2016/0166711 A1 | 6/2016 | Schnee et al. |
| 2016/0168207 A1 | 6/2016 | Kramps et al. |
| 2016/0168227 A1 | 6/2016 | Kallen et al. |

(Continued)

FOREIGN PATENT DOCUMENTS

| | | |
|---|---|---|
| WO | WO 2014/152659 | 9/2014 |
| WO | WO-2017001058 A1 * | 1/2017 |

(Continued)

OTHER PUBLICATIONS

Baker et al Nucleic Acids Research. 27(6): 1547-1551 (Year: 1999).*
Danneberg et al., "Sequence-specific RNA cleavage by PNA conjugates of the metal-free artificial ribonuclease tris(2-aminobenzimidazole)," *Beilstein Journal of Organic Chemistry*, 11:493-498, 2015.
Dogandzhiyski et al., "Studies on Tris(2-aminobenzimidazole)-PNA Based Artificial Nucleases: A Comparison of Two Analytical Techniques," *Bioconjugate Chemistry*, 26(12):2514-2519, 2015.
Kuzuya et al., "Selective activation of two sites in RNA by acridine-bearing oligonucleotides for clipping of designated RNA fragments," *Journal of the American Chemical Society*, 126(5):1430-1436, 2004.
PCT International Search Report and Written Opinion issued in International Application No. PCT/EP2019/086661, mailed Mar. 16, 2020.

*Primary Examiner* — Carla J Myers
(74) *Attorney, Agent, or Firm* — pH IP Law

(57) ABSTRACT

The present invention is concerned with methods for analyzing RNA molecules. The provided methods involve conjugates for RNA cleavage comprising a chemical moiety with RNA cleaving activity and an oligonucleotide. The oligonucleotide is designed based on a target sequence present in an RNA molecule, and the cleavage of the RNA molecule is inter alia carried out at conditions allowing the hybridization of the oligonucleotide to the target 5 sequence. Thereby, the method is easily applicable to RNA molecules of any sequence. The method further involves the analysis of the RNA fragments obtained after cleavage to obtain information on the physical properties of the RNA molecule.

31 Claims, 14 Drawing Sheets

Specification includes a Sequence Listing.

(56) References Cited

U.S. PATENT DOCUMENTS

| | | |
|---|---|---|
| 2016/0235864 A1 | 8/2016 | Schlake et al. |
| 2016/0304883 A1 | 10/2016 | Grund et al. |
| 2016/0304938 A1 | 10/2016 | Wochner |
| 2016/0326575 A1 | 11/2016 | von der Mülbe |
| 2016/0331844 A1 | 11/2016 | Fotin-Mleczek et al. |
| 2017/0014496 A1 | 1/2017 | Fotin-Mleczek et al. |
| 2017/0029847 A1 | 2/2017 | Thess |
| 2017/0114378 A1 | 4/2017 | Wochner et al. |
| 2017/0252430 A1 | 9/2017 | Fotin-Mleczek et al. |
| 2017/0326225 A1 | 11/2017 | Rauch et al. |
| 2018/0044687 A1 | 2/2018 | Thess et al. |
| 2018/0125952 A1 | 5/2018 | Fotin-Mleczek et al. |
| 2018/0126003 A1 | 5/2018 | Hoerr |
| 2018/0142275 A1 | 5/2018 | Roos et al. |
| 2018/0147146 A1 | 5/2018 | Eber et al. |
| 2018/0148727 A1 | 5/2018 | Grund et al. |
| 2018/0201967 A1 | 7/2018 | Eber et al. |
| 2018/0208957 A1 | 7/2018 | Roos et al. |
| 2018/0214537 A1 | 8/2018 | Mutzke et al. |
| 2018/0237786 A1 | 8/2018 | Schlake et al. |
| 2018/0237817 A1 | 8/2018 | Roos et al. |
| 2018/0243219 A1 | 8/2018 | Ketterer et al. |
| 2018/0296663 A1 | 10/2018 | Hipp et al. |
| 2018/0298372 A1 | 10/2018 | Funkner et al. |
| 2018/0312545 A1 | 11/2018 | Baumhof et al. |
| 2018/0371392 A1 | 12/2018 | Mayer et al. |
| 2019/0010485 A1 | 1/2019 | Yazdan Panah et al. |
| 2019/0017100 A1 | 1/2019 | Wochner et al. |
| 2019/0024096 A1 | 1/2019 | Schmid et al. |
| 2019/0040378 A1 | 2/2019 | Fotin-Mleczek et al. |
| 2019/0049414 A1 | 2/2019 | Wochner et al. |
| 2019/0083602 A1 | 3/2019 | Roos et al. |
| 2019/0100784 A1 | 4/2019 | Eber et al. |
| 2019/0125857 A1 | 5/2019 | Rauch et al. |
| 2019/0133950 A1 | 5/2019 | Eber et al. |
| 2019/0160164 A1 | 5/2019 | Rauch et al. |
| 2019/0177714 A1 | 6/2019 | Kunze et al. |
| 2019/0185859 A1 | 6/2019 | Fotin-Mleczek et al. |
| 2019/0194760 A1 | 6/2019 | Koch et al. |
| 2019/0225971 A1 | 7/2019 | Williams |
| 2019/0241633 A1 | 8/2019 | Fotin-Mleczek et al. |
| 2019/0249219 A1 | 8/2019 | Reichert et al. |
| 2019/0336608 A1 | 11/2019 | Baumhof et al. |
| 2019/0336611 A1 | 11/2019 | Baumhof et al. |
| 2019/0343933 A1 | 11/2019 | Horscroft et al. |
| 2019/0343942 A1 | 11/2019 | Fotin-Mleczek et al. |
| 2019/0351044 A1 | 11/2019 | Jasny et al. |
| 2019/0351047 A1 | 11/2019 | Jasny et al. |
| 2019/0351048 A1 | 11/2019 | Rauch |
| 2019/0381180 A1 | 12/2019 | Baumhof et al. |
| 2020/0023076 A1 | 1/2020 | Fotin-Mleczek et al. |
| 2020/0085852 A1 | 3/2020 | Fotin-Mleczek |
| 2020/0085944 A1 | 3/2020 | Heidenreich et al. |
| 2020/0149026 A1 | 5/2020 | Horscroft et al. |
| 2020/0163878 A1 | 5/2020 | Baumhof et al. |
| 2020/0179526 A1 | 6/2020 | Baumhof et al. |
| 2020/0318097 A1 | 10/2020 | Funkner et al. |
| 2020/0392572 A1 | 12/2020 | Yazdan Panah et al. |
| 2021/0030864 A1 | 2/2021 | Petsch et al. |
| 2021/0069315 A1 | 3/2021 | Baumhof et al. |
| 2021/0162037 A1 | 6/2021 | Jasny et al. |
| 2021/0170017 A1 | 6/2021 | Lutz et al. |
| 2021/0180106 A1 | 6/2021 | Wochner et al. |
| 2021/0205434 A1 | 7/2021 | Petsch et al. |
| 2021/0260178 A1 | 8/2021 | Jasny et al. |
| 2021/0261897 A1 | 8/2021 | Yazdan Panah et al. |
| 2021/0361761 A1 | 11/2021 | Lutz et al. |
| 2021/0379181 A1 | 12/2021 | Rauch et al. |
| 2021/0403925 A1 | 12/2021 | Chevessier-Tünnesen et al. |
| 2022/0040281 A1 | 2/2022 | Schwendt et al. |
| 2022/0073962 A1 | 3/2022 | Schwenger et al. |
| 2022/0133908 A1 | 5/2022 | Rejman et al. |
| 2022/0144877 A1 | 5/2022 | Heinz et al. |
| 2022/0211838 A1 | 7/2022 | Oostvogels et al. |
| 2022/0233568 A1 | 7/2022 | Schlake et al. |
| 2022/0296628 A1 | 9/2022 | Thess et al. |
| 2022/0313813 A1 | 10/2022 | Rauch et al. |
| 2022/0340641 A1 | 10/2022 | Aggarwal et al. |
| 2023/0064106 A1 | 3/2023 | Heinz et al. |

FOREIGN PATENT DOCUMENTS

| | | |
|---|---|---|
| WO | WO 2017/098468 | 6/2017 |
| WO | WO 2021/123332 | 6/2021 |
| WO | WO 2021/254593 | 12/2021 |
| WO | WO 2022/023559 | 2/2022 |
| WO | WO 2022/043551 | 3/2022 |
| WO | WO 2022/049093 | 3/2022 |

* cited by examiner

METHODS FOR RNA ANALYSIS

The present application is a national phase application under 35 U.S.C. § 371 of International Application No. PCT/EP2019/086661, filed Dec. 20, 2019, which claims the priority benefit of International Application No. PCT/EP2018/086677, filed Dec. 21, 2018, the entire contents of each of which are hereby incorporated by reference.

FIELD OF THE INVENTION

The present invention relates to the field of RNA analysis. The present invention inter alia concerns methods for analyzing RNA molecules (and populations thereof) with regard to their physical properties. The method involves cleavage of the RNA molecule to be analyzed by one or more conjugates comprising an oligonucleotide and a chemical moiety with RNA cleaving activity to obtain RNA fragments. The cleavage is sequence-specific because of the oligonucleotide which has a sequence that is complementary to a sequence of the RNA molecule to be analyzed. Subsequent to cleavage, the 5' fragment and/or the 3' fragment is/are analyzed for their physical properties. In case one or more central fragment(s) is/are obtained, such central fragment(s) can also be analyzed. Fragment analysis is inter alia carried out by HPLC and/or mass spectrometry. Prior to fragment analysis, the fragments may be purified. The present invention also relates to (i) a conjugate coupled to a solid support, wherein the conjugate comprises a chemical moiety with RNA cleaving activity and an oligonucleotide, (ii) a column comprising the solid support and (iii) a reactor comprising the column or the solid support. The aspects of the present invention can be used in particular in the quality control of RNAs intended for therapeutic purposes.

BACKGROUND OF THE INVENTION

Messenger RNA ("mRNA") therapy is becoming an increasingly important approach for the treatment of a variety of diseases. Effective mRNA therapy requires effective delivery of the mRNA to the patient and efficient production of the protein encoded by said mRNA within the patient's body.

For the successful development of mRNA-based therapeutics, the production of RNA molecules as active pharmaceutical ingredients must be efficient in terms of yield, quality, safety and costs, especially when mRNA is produced at a large scale. Quality controls may be implemented during mRNA production and/or following mRNA production and/or as an mRNA batch release quality control.

For any application of mRNA in a scientific or therapeutic setting, it is highly desired or mandatory to use mRNA with a defined sequence and structure that can be reproduced in a reliable manner. In particular, the 5' terminal region (e.g. harboring a cap structure) and the 3' terminal region (e.g. harboring a homopolymeric tail) of an mRNA are known to be involved in the regulation of mRNA stability and translation efficiency. Accordingly, the 5' cap structure and the 3' tail are important features for efficient translation of mRNA and protein synthesis in eukaryotic cells and, therefore, the produced mRNA should be controlled for such key functional features. In addition, non-capped RNA typically harbors a 5'-terminal triphosphate group that is known to stimulate the innate immune system via activation of e.g. pattern recognition receptor RIG-1. Therefore, non-capped RNA may generate undesired immune responses in a subject. Thus, a pharmaceutical mRNA product has to be controlled for the presence of non-capped 5'-triphosphate RNA.

Messenger RNA molecules are typically produced by RNA in vitro transcription of a suitable DNA template. 3' homopolymeric tails (e.g. poly(A) tails) as well as 5' cap structures are typically introduced during RNA in vitro transcription, e.g. co-transcriptionally, or via enzymatic methods after RNA in vitro transcription. Further, methods for the production of pharmaceutical-grade RNA are known in the art (e.g. WO2016180430).

A co-transcriptional approach using DNA dependent RNA polymerase enzymes primed with cap analogues (e.g. di-nucleotide analogues to generate Cap0 structures, or tri-nucleotide cap analogues to generate Cap1 structures) is widely used for RNA in vitro synthesis of capped RNAs. Cap analogues are non-natural substrates for RNA polymerases that can be incorporated by the enzymes at the 5' end of the nascent RNA. As GTP is always present in RNA transcription reactions, a certain proportion of the generated RNA will inevitably start with the standard GTP, resulting in a non-capped RNA harboring a 5'-terminal triphosphate group rather than a 5'-terminal cap structure. Additionally, most conventional cap analogues may be incorporated in two different orientations during RNA in vitro transcription: a functional forward orientation, and a non-functional reverse orientation.

Besides co-transcriptional capping, enzymatic capping of mRNA is performed in the art. Vaccinia virus capping enzyme has been widely used as an enzyme for capping RNAs in vitro. In the presence of a methyl donor and GTP, enzymatic capping is facilitated with high efficiency in the naturally occurring forward orientation, resulting in the generation of a Cap0 structure. An additional methylation step using cap-specific nucleoside 2'-O-methyltransferase enzyme may be performed to generate Cap1 structures. However, also when using enzymatic capping, a certain portion of the RNA remains non-capped or a certain portion of the RNA may have an incomplete methylation pattern.

Homopolymeric tails located in the 3' region of RNA (e.g. PolyA or PolyC) are typically generated during RNA in vitro transcription reactions, wherein the homopolymeric stretch may be provided by the template DNA. However, due to the homopolymeric nature of the 3' region of RNA, the tails often vary in length and/or sequence which may influence the stability and/or translatability of the resulting mRNA.

Polynucleotidylation may also be performed enzymatically using poly(N) polymerases (PNPs) which are in solution together with all other reaction components, such as RNA and nucleotides. However, it remains challenging to control the enzymatic reaction in such a manner that homogeneous 3' tails are generated (that is: tails having the same length).

For therapeutic purposes, it is requested by the authorities to control the composition of the pharmaceutical mRNA drug. Therefore, it may be mandatory to control for capping efficiency and/or quality via analyzing the 5' cap structure. Further, it may be mandatory to control for the length and/or quality and of the tail via analyzing the 3' tail of an mRNA.

Several methods for 5' cap or 3' analysis of RNA have been described in the art. These methods are described in the following.

WO 2014/152673 describes a capping assay suitable for relative quantification of capping efficiency via a Biotin-Streptavidin-Based Oligo-dT Capture ELISA, wherein capping efficiency is quantified using a cap-specific antibody. The functionality of such a capping assay is dependent on various parameters, including the interaction of the mRNA sample with an oligo-dT capture probe, and the binding efficiency of a cap-antibody to the m7G cap of the mRNA sample. Such an assay would have to be adjusted to mRNA products harboring different cap structures (cap0, cap1, cap2), or to different modifications of the 5' terminal fragment, as all these features may influence the binding of a cap-antibody. Moreover, said assay may not allow for the distinction of reverse cap structures that may be formed during production of the RNA or for the determination of variations in methylation patterns of the cap structure.

WO 2017/098468 relates to methods to qualitatively and quantitatively determine mRNA capping, and to determine 5' capping efficiency and 5' cap identity in RNA samples, all without the need for radiolabels, by using tagged probes that are complementary to the 5' end of target RNA and RNAse H to cleave the 5' end of RNA, then using LC-MS to determine the 5' RNA products.

WO 2014/152659 describes a capping assay where the mRNA sample is incubated with a DNA oligonucleotide complimentary to a sequence in the 5' untranslated region of the mRNA. The thereby formed DNA-RNA duplex located in the 5' region of the RNA has to be degraded by employing a separate nuclease digestion step, e.g. an RNAse H digestion step, to generate fragments that are further analyzed by e.g. chromatography. One disadvantage of such an assay is the involvement of a separate RNAse H digestion step, which introduces another variable that may lead to errors. Additionally, a partial digestion of the DNA-RNA duplex caused by RNAse H is likely which will cause a bias in the downstream analysis process. Moreover, RNAseH binding may be impaired by secondary structures of the DNA-RNA duplex.

WO 2015/101416 and WO 2017/001058 describe assays suitable for the analysis of the 5' terminal region (WO 2015/101416) and the 3' terminal region (WO 2017/001058). Both assays involve a sequence specific Ribozyme or DNAzyme digestion. Such molecules may be designed to bind to specific regions of an RNA (Ribozyme or DNAzyme binding sites), thereby cleaving the RNA, allowing analysis of 5' terminal region, and the 3' terminal region. However, Ribozymes or DNAzymes may have to be re-designed, or respective cleavage sites have to be introduced into each different RNA product, which may not always be possible. RNA cleavage may also fail due to sequence and/or secondary structure. Moreover, Ribozyme or DNAzymes are only active in the presence of buffers comprising high Magnesium (Mg2+) concentrations, which may cause unspecific Mg2+ induced degradation of the RNA. Therefore, such an assay may not be applicable for a wide range of different RNA products (e.g. RNA products with different UTRs).

Nucleic acid molecules harboring a chemical moiety with RNA cleaving activity are described in the art. Gnaccarini et al. (Journal of the American Chemical Society (2006)) describes a conjugate of an RNA cleaving tris(2-aminobenzimidazole), a chemical catalytic moiety, attached to a nucleic acid molecule (DNA). The authors show that said nucleic acid molecules harboring a chemical catalytic moiety can cleave fluorescently labeled short non-coding RNA oligonucleotides.

In light of the above, assays suitable for controlling the quality of a 5' terminal region (e.g. Cap structure), as well as the 3' terminal region of an mRNA (e.g. PolyA tail) are needed in the art, particularly in the field of pharmaceutical RNA production. In addition, assays are required that allow the analysis of other sequence elements for determining other quality attributes of an RNA.

Advantageously, such an assay should be applicable for a wide range of different mRNA products (e.g. mRNA having different cap structures, different sequences, or different PolyA structures), should be simple, cost effective (e.g., no enzymes, antibodies, or nucleases involved), efficient, precise (e.g., distinction between forward and reverse cap orientation), and fast. Further desired would be an assay that would enable the simultaneous analysis of 5' terminal region and the 3' terminal region, or the simultaneous analysis of the entire sequence (e.g. for obtaining an RNA fingerprint or RNA signature profile).

SUMMARY OF THE INVENTION

The present invention solves the above need by inter alia providing a method for analyzing an RNA molecule involving one or more conjugate(s) comprising an oligonucleotide and a chemical moiety with RNA cleaving activity to obtain RNA fragments. The chemical moiety with RNA cleaving activity is directed by the oligonucleotide, which is comprised in the conjugate, to a specific site at the RNA molecule, where the cleavage is desired and shall take place. This is achieved by the well-known process of hybridizing the oligonucleotide, which is in its sequence complementary to a target sequence, to the RNA molecule comprising this target sequence. The principles underlying this hybridization are well-known and established, in particular from primer-design, namely to come up with a suitable sequence that is complementary to the target sequence. The RNA cleavage is thus sequence-specific and may in principle be carried out such that the cleavage takes place at any desired site of the RNA molecule, simply by designing the sequence of the oligonucleotide as complementary sequence to the target sequence of the RNA. In other words, the conjugate comprising the RNA cleaving activity can be easily adapted and directed to any RNA sequence by choosing a complementary oligonucleotide sequence. The provided methods are therefore easily applicable to RNAs with different sequences. The fragments obtained after RNA cleavage can be easily analyzed for their physical properties.

In the following, the aspects of the invention are described. Embodiments of these aspects are also mentioned.

First Aspect: Method for Analyzing an RNA Molecule

In a first aspect, the present invention provides a method for analyzing an RNA molecule comprising the following steps:
  (i) providing an RNA molecule;
  (ii) providing at least one conjugate comprised of a chemical moiety with RNA cleaving activity and an oligonucleotide, wherein the sequence of said oligonucleotide is complementary to a target sequence of the RNA molecule;
  (iii) cleaving the RNA molecule provided in step (i) to obtain RNA fragments by contacting the RNA molecule with the at least one conjugate provided in step (ii) under conditions allowing the hybridization of said oligonucleotide to said target sequence and the cleavage of the RNA molecule; and
  (iv) determining a physical property of the RNA molecule by analyzing one or more of the RNA fragments obtained in step (iii).

In one embodiment, cleaving the RNA molecule in step (iii) results in a 5' fragment and a 3' fragment. In a further embodiment, cleaving the RNA molecule in step (iii) results in a 5' fragment, a 3' fragment and one or more central fragments. The number of fragments obtained depends on the number of target sequences present in the RNA molecule and/or on the number of conjugates with different target sequences used in the method. Thus, the number of target sequences present in the RNA molecule and/or the number of conjugates used in the method determine(s) the number of cleavage sites and, hence, the number of fragments obtained.

In one embodiment, one conjugate (i.e. a single conjugate) is provided step (ii) and used for cleavage in step (iii). In another embodiment, two conjugates are provided step (ii) and used for cleavage in step (iii). In yet another embodiment, three conjugates are provided step (ii) and used for cleavage in step (iii). In a further embodiment, four conjugates are provided step (ii) and used for cleavage in step (iii). It can be particularly preferred to provide two conjugates in step (ii), which are used for cleavage in step (iii), namely the first conjugate cleaving close to the 5' end of the RNA molecule thus providing a 5' fragment and the second conjugate cleaving close to the 3' end of the RNA molecule thus providing a 3' fragment.

In one embodiment, the fragments are separated from each other before analyzing the one or more of the RNA fragments in step (iv). In another embodiment, the fragments are separated from the at least one conjugate. In yet another embodiment, the fragments are separated from each other and from the at least one conjugate. The fragments and the conjugate(s) may be separated by any suitable method.

In one embodiment, the fragments and/or the conjugate(s) are separated by chromatography. In a preferred embodiment, the fragments and/or the conjugate(s) are separated by high performance liquid chromatography (HPLC). In another preferred embodiment, the fragments and/or the conjugate(s) are separated by affinity chromatography. In a particularly preferred embodiment, the fragments and/or the conjugate(s) are separated by oligo-dT based capturing column chromatography. Oligo-dT based capturing column chromatography may in particular make use of oligo-dT oligonucleotides coupled to a solid support, where polyA-containing fragments bind to the oligo-dT oligonucleotides and can thereby be captured by the column, whereas fragments not comprising polyA-sequences run through. The captured polyA-containing fragments, which may also be referred to as 3' fragments, may then be eluted and are accordingly then separated from other fragments. In other embodiments, the fragments and/or the conjugate(s) are separated by anion exchange chromatography. In other embodiments, the fragments and/or the conjugate(s) are separated by size exclusion chromatography.

In another embodiment, the fragments and/or the conjugate(s) are separated by electrophoresis. In a preferred embodiment, the fragments and/or the conjugate(s) are separated by gel electrophoresis. In a further preferred embodiment, the fragments and/or the conjugate(s) are separated by capillary gel electrophoresis.

The different separation methods may be used alone or in combination. For example, the fragments obtained in step (iii) may be separated by HPLC and the separated fragment(s) thus obtained may be further separated and/or purified and/or concentrated, e.g. by affinity chromatography.

In one embodiment, a physical property, such as in particular the length, of at least one fragment may be already be determined during the separation step, e.g. the length of a fragment may be determined by HPLC. Concerning e.g. the 3' fragment, an elongation of the 3' terminus in particular RNAs may lead to a longer retention time during fragment separation on HPLC compared to RNA molecules, where the 3' terminus is not elongated.

In one embodiment, the 5' fragment is analyzed in step (iv). In another embodiment, the 3' fragment is analyzed in step (iv). In a further embodiment, one or more of the central fragments are analyzed in step (iv). Any one or more of the fragments obtained in step (iii) may be analyzed for one or more of their physical properties. In one embodiment, the 5' fragment and the 3' fragment are analyzed in step (iv). In another embodiment, the 5' fragment, the 3' fragment and one central fragment are analyzed in step (iv). In yet another embodiment, all fragments obtained in step (iii) are analyzed in step (iv). The fragments may either be analyzed for the same physical property or they may be analyzed for different physical properties. Methods for analysis include any suitable method. Examples are mass spectrometry (MS), HPLC (e.g. using a silica-based C18 analytic column or a polystyrene divinyl benzene (PVD)-based analytic column), reverse phase liquid chromatography (RPLC), high turbulence liquid chromatograph (HTLC), fast performance liquid chromatographs (FPLC), anion exchange chromatography, size exclusion chromatography, capillary gel electrophoresis, RNA sequencing, agarose gel electrophoresis and/or mass-spectrometry (LC-MS), or combinations thereof. It is generally preferred to use analytical methods, such as e.g. analytical MS or analytical HPLC.

Further, any physical property of a fragment may be determined. On a general level, a physical property can be selected from the group consisting of (i) presence of a 5' cap structure; (ii) capping efficiency (ratio of "capped RNA" vs. "un-capped RNA", see the second aspect for more details); (iii) methylation pattern of the 5' cap; (iv) orientation of the 5' cap; (v) length of the 5' terminal region; (vi) integrity of the 5' terminal region; (vii) number of A, U, G and C nucleotides in the 5' terminal region; (viii) presence of modified nucleotides in the 5' terminal region; (xi) presence of a 3' modification; (x) length of the 3' terminal region; (xi) integrity of the 3' terminal region; and (xii) number of A, U, G and C nucleotides in the 3' terminal region, (xii) length of a fragment.

In one embodiment, the 5' fragment is analyzed for the presence of a cap structure. In another embodiment, the 5' fragment is analyzed for the presence and integrity of a cap structure. The presence and/or integrity of a cap structure may be analyzed by analytical mass spectrometry. The presence and/or integrity of a cap structure may also be analyzed by analytical HPLC.

In one embodiment, the methylation pattern of the 5' fragment is analyzed. The methylation pattern may be analyzed by analytical mass spectrometry. The methylation pattern may also be analyzed by analytical HPLC.

In one embodiment, the 5' fragment is analyzed for the orientation of its cap structure. Such an analysis is particularly important in embodiments where a cap analogue has been used for co-transcriptional capping of the RNA. For analysis of the orientation of the cap structure, analytical HPLC can in particular be used.

Although this might generally be less preferred for the analysis of the 5' fragment, the 5' fragment may be analyzed for its length and/or its nucleotide composition. The 5' fragment may also be analyzed for the presence of modified nucleotides. Analysis may be carried out by complete hydrolysis of the 5' fragment followed by analysis of the individual nucleotides gained thereby. Analysis can be carried out by analytical HPLC or analytical mass spectrometry.

In one embodiment, the 5' fragment has a length of about 1 to about 100 nucleotides. In another embodiment, the 5' fragment has a length of about 1 to about 50 nucleotides. In yet another embodiment, the 5' fragment has a length of about 1 to about 25 nucleotides. In a preferred embodiment, the 5' fragment has a length of about 10 to about 15 nucleotides. In one embodiment, the 5' fragment comprises the cap structure and the 5' UTR.

In one embodiment, the 3' fragment is analyzed, wherein a particular preferred embodiment relates to the analysis of the presence of a homopolymeric sequence. In one embodiment, the homopolymeric sequence is a polyA sequence. In another embodiment, the homopolymeric sequence is a polyC sequence. The 3' fragment may also comprise a polyA sequence and a polyC sequence.

In one embodiment, the 3' fragment is analyzed for its nucleotide composition. In one embodiment, the 3' fragment is analyzed for its length. In one embodiment, the 3' fragment is analyzed for its nucleotide composition and its length. In one embodiment, the 3' fragment is analyzed for the presence of modified nucleotides. Analysis may be carried out by complete hydrolysis of the 3' fragment followed by analysis of the individual nucleotides gained thereby. Analysis can be carried out by analytical HPLC or analytical mass spectrometry.

In one embodiment, the 3' fragment has a length of about 10 to about 500 nucleotides. In another embodiment, the 3' fragment has a length of about 50 to about 500 nucleotides. In a preferred embodiment, the 3' fragment has a length of about 50 to about 250 nucleotides. In one embodiment, the 3' fragment comprises a homopolymeric region and the 3' UTR.

In one embodiment, a total hydrolysis of a fragment as described in WO 2017/149139A1 may be performed to further characterize the fragment. Alternatively, in one embodiment, total hydrolysis of a fragment may be performed using alkaline hydrolysis, e.g. by incubating the RNA fragment in an alkaline sodium carbonate buffer (e.g., 50-500 mM Sodium Carbonate [$NaHCO_3/Na_2CO_3$] pH at about 7-9.2) at about 25-95° C.

The provided method can be used for the analysis of any type of RNA molecule, wherein the RNA molecule is preferably a single-stranded RNA molecule and has a known sequence. In a particular preferred embodiment, the RNA molecule is an mRNA molecule (which is by definition single-stranded). In an even more preferred embodiment, the RNA molecule is an mRNA molecule with a given, i.e. known, sequence, such as e.g. an mRNA molecule coding for a specific protein. In one embodiment, the RNA molecule comprises a naturally occurring 5' cap structure. In one embodiment, the RNA molecule is capped at its 5' end with a cap analogue.

In a preferred embodiment, the provided method is used for the analysis of a therapeutic RNA. In a preferred embodiment, the provided method is used for the analysis of a purified RNA. In a more preferred embodiment, the provided method is used for the analysis of a pharmaceutical grade RNA. Accordingly, in step (i) of the method, a therapeutic RNA and/or a pharmaceutical grade RNA and/or a purified RNA is provided.

In one embodiment, the sequence of the RNA molecule is known and the RNA molecule is obtained from a sample. In a preferred embodiment, the RNA molecule is obtained by RNA in vitro transcription. In this preferred embodiment, the sequence of the RNA molecule is known from the underlying DNA template.

In a particularly preferred embodiment, the RNA molecule is a pharmaceutical-grade RNA molecule obtained by an RNA in vitro transcription process. Various purification and quality control steps on DNA and RNA level are typically implemented in order to arrive at a pharmaceutical-grade RNA molecule, as e.g. described in published PCT patent application WO 2016/180430.

Particularly when the RNA molecule is an mRNA molecule, the RNA molecule may comprise a 5' cap structure and/or a 3' homopolymeric sequence. It is even more preferred that, when the RNA molecule is an mRNA molecule, the RNA molecule comprises a 5' cap structure and a 3' homopolymeric sequence. The presence of the cap structure on the RNA molecule may be the result of the application of an in vitro capping assay (that is, co-transcriptional capping or enzymatic capping).

The RNA molecule may generally be of any length. For example, the RNA molecule comprises at least about 300 nucleotides, at least about 500 nucleotides, at least about 700 nucleotides, at least about 1000 nucleotides, at least about 2000 nucleotides, at least about 3000 nucleotides, at least about 4000 nucleotides, at least about 5000 nucleotides, at least about 6000 nucleotides, at least about 7000 nucleotides, or at least about 8000 nucleotides. The RNA molecule can comprise overall about 9000 nucleotides but is not limited thereto.

In one embodiment, at least two conjugates are provided and contacted at the same time with the RNA molecule to simultaneously cleave the RNA molecule, wherein the at least two conjugates comprise oligonucleotides with sequences complementary to different target sequences of the RNA molecule. In another embodiment, at least two conjugates are provided and contacted one after the other with the RNA molecule to sequentially cleave the RNA molecule, wherein the at least two conjugates comprise oligonucleotides with sequences complementary to different target sequences of the RNA molecule. The present method comprises embodiments involving any number of conjugates. The conjugates may be contacted with the RNA molecule simultaneously or sequentially. In case the RNA molecule is contacted with the conjugates sequentially, one or more purification steps may be included between the different cleaving steps.

The conjugate as defined herein comprises a chemical moiety with RNA cleaving activity and an oligonucleotide and embodiments thereof are described in the following.

In one embodiment, the oligonucleotide has a length of about 5 to about 100 nucleotides. In another embodiment, the oligonucleotide has a length of about 5 to about 50 nucleotides. In a preferred embodiment, the oligonucleotide has a length of about 5 to about 25 nucleotides.

The sequence of the oligonucleotide is complementary to a target sequence of the RNA molecule, and this will result in the oligonucleotide hybridizing to the target sequence. As defined herein below, the term "complementary" does not necessarily mean that the sequence of the oligonucleotide is over its entire length complementary to the target sequence (or, put in other words, the sequence of the oligonucleotide is a sequence that is completely identical to/has a 100% identity to the complement sequence of the target sequence), although this is a preferred embodiment in the present invention. Rather, the sequence of the oligonucleotide is complementary to the target sequence of the RNA molecule to such a degree that the hybridization will take place specifically between the target sequence of the RNA molecule and the oligonucleotide (under the selected hybridization conditions). Accordingly, the sequence of the oligonucleotide is complementary to the target sequence of the RNA molecule to such a degree that no hybridization between a non-target sequence of the RNA molecule and the oligonucleotide takes place (under the selected hybridization conditions). This means that the sequence of the oligonucleotide is in some embodiments not completely identical to the complement sequence of the target sequence but has a lower identity than 100%. Accordingly, in one embodiment, the sequence of the oligonucleotide has at least a 95% sequence identity with the complement sequence of the target sequence. In yet another embodiment, the sequence of the oligonucleotide has at least a 90% sequence identity with the complement sequence of the target sequence. In yet another embodiment, the sequence of the oligonucleotide has at least a 85% sequence identity with the complement sequence of the target sequence. In yet another embodiment, the sequence of the oligonucleotide has at least a 80% sequence identity with the complement sequence of the target sequence. In the most preferred embodiment, the sequence of the oligonucleotide has a 100% sequence identity with the complement sequence of the target sequence. Thus, the sequence of the oligonucleotide is in some embodiments not completely identical to the complement sequence of the target sequence but has at least one mismatched nucleotide (that is, a nucleotide in the oligonucleotide sequence that is not complementary to the respective nucleotide of the target sequence). Accordingly, in one embodiment, the sequence of the oligonucleotide comprises at least 1, 2, 3, 4, or 5 mismatched nucleotides, but preferably not more than 6 mismatched nucleotides. In the most preferred embodiment, the sequence of the oligonucleotide does not comprise a mismatched nucleotide.

The target sequence may be present at any position in the RNA molecule.

In one embodiment, a target sequence is in the 5' terminal region of the RNA molecule and may be located adjacent to the 5' cap, namely on the 3' side of the 5' cap (i.e. downstream). In other embodiments, the target sequence may be about 1 to about 100 nucleotides downstream of the 5' cap, preferably about 1 to about 50 nucleotides downstream of the 5' cap, most preferably about 1 to about 25 nucleotides downstream of the 5' cap. Accordingly, after cleaving the RNA molecule, a 5' fragment of about 1 to about 100 nucleotides in length, preferably a 5' fragment of about 1 to about 50 nucleotides in length, most preferably a 5' fragment of about 1 to about 25 nucleotides in length is generated.

In one embodiment, a target sequence is in the 3' terminal region of the RNA molecule and may be located adjacent to the 3' homopolymeric region, namely on the 5' side of the 3' terminal region (i.e. upstream). In other embodiments, the target sequence may be about 10 to about 500 nucleotides upstream of the 3' terminus, preferably about 50 to about 500 nucleotides upstream of the 3' terminus, most preferably about 50 to about 250 nucleotides upstream of the 3' terminus. Accordingly, after cleaving the RNA molecule, a 3' fragment of about 10 to about 500 nucleotides in length, preferably a 3' fragment of about 50 to about 500 nucleotides in length, most preferably a 3' fragment of about 50 to about 250 nucleotides in length is generated.

In one embodiment, the conjugate comprises a chemical moiety with RNA cleaving activity coupled to the oligonucleotide via a covalent bond. In another embodiment, the conjugate consists of a chemical moiety with RNA cleaving activity coupled to the oligonucleotide via a covalent bond.

In one embodiment, the conjugate comprises a chemical moiety with RNA cleaving activity coupled to the oligonucleotide via a spacer. In another embodiment, the conjugate consists of a chemical moiety with RNA cleaving activity coupled to the oligonucleotide via a spacer. The spacer may have any suitable structure. For example, the spacer may comprise an alkyl group of any length (an "alkyl unit"). In one embodiment, the spacer comprises a C5 to C15 alkyl unit. In a preferred embodiment, the spacer comprises a C6 to C10 alkyl unit or a C6 to C9 alkyl unit. In a more preferred embodiment, the spacer comprises a C6 or a C8 alkyl unit. The spacer is preferably coupled via an amide group.

In one embodiment, the conjugate comprises a chemical moiety with RNA cleaving activity coupled to the oligonucleotide at the 5' end of said oligonucleotide. In an alternative embodiment, the conjugate comprises a chemical moiety with RNA cleaving activity coupled to the oligonucleotide at the 3' end of said oligonucleotide. The orientation can depend on the desired site at which the cleavage shall take place. If a 5' fragment shall be obtained, it can be preferred to have the chemical moiety with RNA cleaving activity coupled to the oligonucleotide at the 3' end of said oligonucleotide such that the cleavage takes place at or close to the 5' end of the target sequence. If a 3' fragment shall be obtained, it can be preferred to have the chemical moiety with RNA cleaving activity coupled to the oligonucleotide at the 5' end of said oligonucleotide such that the cleavage takes place at or close to the 3' end of the target sequence.

In one embodiment, the oligonucleotide is a DNA oligonucleotide. In another embodiment, the oligonucleotide is an RNA oligonucleotide. In yet another embodiment, the oligonucleotide comprises DNA and RNA nucleotides. In any case, after hybridization, there is a double-strand structure comprised of RNA and the oligonucleotide such that e.g. an "RNA-hybrid" double-stranded structure may be obtained.

In one embodiment, the oligonucleotide comprises one or more LNA nucleotides. In another embodiment, the oligonucleotide comprises one or more PNA nucleotides. In yet another embodiment, the oligonucleotide comprises LNA and PNA nucleotides.

The oligonucleotide may comprise additional modifications, e.g. modifications that allow immobilization of the conjugate. It is of course understood that such modifications do not interfere with the capability of the oligonucleotide to hybridize to the target sequence of the RNA molecule. For conjugates comprising the chemical moiety with RNA cleaving activity at the 5' end of the oligonucleotide, the additional modification is advantageously present at the 3' end of the oligonucleotide. Preferred in that context is an azide modification, preferably a 3' azide modification. An azide modification allows coupling of the conjugate to an alkyne activated solid support via click chemistry. Also preferred in that context is an alkyne modification, preferably a 3' alkyne modification. An alkyne modification allows coupling of the conjugate to an azide activated solid support via click chemistry. Alternatively, a biotin modification, preferably a 3' biotin modification may be used. A biotin modification allows coupling of the conjugate to a streptavidin solid phase.

For conjugates comprising the chemical moiety with RNA cleaving activity at the 3' end of the oligonucleotide, the above described additional modifications are advantageously present at the 5' end of the oligonucleotide.

The additional modification may be used to couple the conjugate to a support. Such coupling may improve the cleavage efficiency. Further, such coupling may simplify the analysis of the fragments since the conjugate will stay in the solid support and will not contaminate the fragments obtained. For example, a conjugate may be immobilized (e.g. via click chemistry or biotin-streptavidin) on a support. The RNA molecule may be contacted with a column comprising the conjugate coupled to the support. Optionally, the obtained eluate may be contacted again with the column to increase cleaving efficiency since the eluate may still comprise uncleaved RNA.

In one embodiment, the target sequence is present once in the RNA molecule. In another embodiment, the target sequence is present more than once in the RNA molecule. For example, the target sequence may be present twice in the RNA molecule.

In one embodiment, the chemical moiety with RNA cleaving activity catalyzes the hydrolysis of an RNA phosphodiester bond of an RNA backbone. The chemical moiety with RNA cleaving activity may be an acid catalyst or a base catalyst. In one embodiment, the chemical moiety with RNA cleaving activity is an artificial moiety, i.e. a moiety that has been chemically engineered to carry out its activity.

The chemical moiety with RNA cleaving activity may generally cleave double-stranded or single-stranded RNA. In a preferred embodiment of the present invention, the chemical moiety with RNA cleaving activity cleaves single-stranded RNA. The chemical moiety with RNA cleaving activity may cleave metal-dependent or metal-independent. In a preferred embodiment, the cleavage is a metal independent activity of the chemical moiety with RNA cleaving activity.

In a preferred embodiment, the chemical moiety with RNA cleaving activity cleaves independent of divalent metal ions (e.g. Mg2+). Accordingly, the chemical moiety with RNA cleaving activity effectively cleaves the target RNA in the absence of divalent metal ions. In other words, the chemical moiety with RNA cleaving activity does not require metal cofactors, such as Mg2+.

A chemical moiety with metal-independent RNA cleaving activity may be selected from the group consisting of
  (i) Tris(2-aminobenzimidazol), 1H-Imidazo[1,2-a]imidazole, 5H-Benzimidazo[1,2-a] benzimidazol, Hexahydro-2H-pyrimido [1,2a] pyrimidin-2,8-dion, 2-Aminobenzimidazol, Imidazo[1,2-a] benzimidazol, 2-Aminochinolin,
  (ii) moieties derived from Diethylentriamin (DETA), for example a DETA-PEG, or
  (iii) moieties derived from Diethylentriamin, Tetramin, 2-aminopyridin, 2-Aminoperimidin, 2-(Methyl-amino) perimidin, Bis(2-aminoperimidin), Tris(2-aminoperimidin), 2-Amino-6-bromperimidin, 2-Ammo-6-carbonsäuremethylesterperimidin-Hydrobromid,
    2-Amino-6 (essigsäuremethylester) perimidin-Hydrobromid, 2-Amino-6-(propionsäuremethylester) perimidin-Hydrobromid, and 2-Amino-6-methylperimidin-Hydrobromid.

A chemical moiety with metal-dependent RNA cleaving activity may be iminodiacetic acid or texaphyrin employing e.g. lanthanide (III) ions for RNA hydrolysis.

In a particularly preferred embodiment, the chemical moiety with RNA cleaving activity is tris(2-aminobenzimidazole), which is also depicted in FIG. 1.

In preferred embodiments, the chemical moiety with RNA cleaving activity may be coupled via an alkyl unit (that may generally be referred to as spacer), such as e.g. a Ce unit, to an oligonucleotide, e.g. as depicted in FIG. 2.

FIG. 2 generally outlines preferred embodiments in terms of the moiety with RNA cleaving activity, where the spacer S may vary in terms of the length of the alkyl unit (see above) and where further modifications at the position "R" (mainly lower alkyl substituents) may be present with H being most preferred.

In one embodiment, the molar ratio of each of the at least one conjugate(s) to the RNA molecule is between about 1:1 and about 10:1. In a preferred embodiment, the molar ratio of each of the at least one conjugates to the RNA molecule is between about 1:1 and about 2:1. In specific embodiments, the molar ratio of each of the at least one conjugates to the RNA molecule is about 5:1, about 6:1, about 7:1, or about 8:1.

While it is generally possible to carry out the hybridization and the cleavage of the RNA molecule in step (iii) under the same conditions, it is preferred to carry out the hybridization and the cleavage of the RNA molecule under different conditions. In particular, hybridization and cleavage may occur at different temperatures. At least one additional temperature shift can advantageously be included prior to the hybridization to denature all nucleotide molecules present, optionally present in the form of secondary structures or undesired double-stranded structures, in order to allow for a more efficient subsequent hybridization. A temperature cycle may include different temperatures for hybridization, cleavage and/or denaturation. Such a temperature cycle may be repeated multiple times to increase the overall cleavage efficiency.

The temperature for hybridization depends on the Tm of the oligonucleotide, which is in turn dependent on the length and the GC-content of the oligonucleotide, and the composition (DNA, LNA, and/or RNA nucleotides). It can generally be stated as ranging from about 5° C. to about 50° C. It is preferred to select the hybridization temperature as high as possible to (i) allow for a hybridization and (ii) to reduce or prevent the formation of secondary structures in the RNA molecule which could impede the binding to the target region.

The temperature for cleavage is usually within the range of about 5° C. to about 35° C. or in the range of 5° C. to 50° C., wherein a temperature of about 20° C. to about 40° C. is preferred. The temperature for cleavage also depends on the Tm of the oligonucleotide, which is in turn dependent on the length and the GC-content of the oligonucleotide, and the composition (DNA, LNA, and/or RNA nucleotides). It is preferred to select the cleavage temperature as high as possible to (i) allow for a hybridization and (ii) to reduce or prevent the formation of secondary structures in the RNA molecule which could impede the binding to the target region, and to (iii) increase the conversion efficiency.

The temperature for denaturation may be in the range of from about 70° C. to about 90° C. Accordingly, in one embodiment, the conditions allowing the hybridization and the cleavage of the RNA molecule comprise one or more temperature shifts.

Accordingly, in preferred embodiments, at least 2, 3, 4, 5, 6, 7, 8, 9, or 10 temperature cycles are included with different temperatures for hybridization, cleavage and/or denaturation as defined above.

In one embodiment, the present invention provides a method for analyzing an RNA molecule comprising the following steps:
  (i) providing an RNA molecule;
  (ii) providing at least one conjugate comprised of a chemical moiety with RNA cleaving activity and an oligonucleotide, wherein the sequence of said oligonucleotide is complementary to a target sequence of the RNA molecules;
  (iii) cleaving the RNA molecule provided in step (i) to obtain RNA fragments by contacting the RNA molecule with the at least one conjugate provided in step (ii) at a first temperature between about 5° C. and about 50° C., optionally at a second temperature between about 20° C. and about 40° C., and at a third temperature between about 70° C. and about 90° C.;
(iv) repeating step (iii) at least once; and
(v) determining a physical property of the RNA molecule by analyzing one or more of the RNA fragments obtained in step (iii).

In a preferred embodiment, step (iii) is repeated at least 2×, at least 3×, at least 4×, at least 5×, or at least 6×.

The first temperature and the second temperature are suitable for hybridization of the oligonucleotide to the target sequence and for cleavage of the RNA molecule. It can be preferred that the first temperature is for the hybridization, whereas the second temperature is for the cleavage. However, it is inter alia evident from the overlap of the first and the second temperature that particularly a temperature in the overlap range, i.e. a temperature between about 20° C. to about 40° C., is suitable for hybridization as well as cleavage.

In a preferred embodiment, the temperature for hybridization (first temperature) is between 20° C. and 30° C., the temperature for cleavage (second temperature) is between 35° C. and 45° C. and the temperature for denaturation (third temperature) is between 80° C. and 90° C. In a further preferred embodiment, the temperature for hybridization (first temperature) is about 25° C., the temperature for cleavage (second temperature) is about 40° C. and the temperature for denaturation (third temperature) is about 85° C. As noted, the temperature for hybridization and cleavage may be essentially identical.

Hybridization and cleavage (and denaturation, if applicable) in step (iii) may occur under various suitable buffer conditions. In one embodiment, hybridization and cleavage occur in a buffer comprising 30-70 mM Tris at a pH of 7.5-8.5. In a preferred embodiment, the buffer comprises 50 mM Tris at pH 8. In a particularly preferred embodiment, the buffer does not comprise phosphate. The presence of phosphate generally tends to inhibit the cleavage reaction.

The buffer may additionally comprise EDTA in a range of about 0.5 mM to about 20 mM. Preferably, the buffer comprises about 1 mM EDTA to about 10 mM EDTA. In a preferred embodiment, the buffer comprises 50 mM Tris at pH 8 and 1 mM EDTA. The purpose of an EDTA comprising buffer is to protect the RNA molecule from unspecific degradation (e.g. caused by trace amounts of Mg2+).

The buffer may additionally comprise NaCl in a range of about 1 mM to about 100 mM. Preferably, the buffer comprises about 30 mM NaCl to about 70 mM NaCl. In a preferred embodiment, the buffer comprises 50 mM Tris at pH 8 and 50 mM NaCl. The purpose of an NaCl comprising buffer is to improve hybridization of the oligonucleotide to the RNA molecule.

In a further preferred embodiment, the buffer comprises 50 mM Tris at pH 8, 50 mM NaCl and 1 mM EDTA.

In preferred embodiments, the buffer does not comprise detectable amounts of Mg2+. The presence of Mg2+ generally tends to degrade the RNA molecule, especially if one or more temperature shifts/temperature cycles are implemented.

Step (iii) of the method may further comprise a step, where additional conjugate is added. Such additional conjugate might result in an increased cleavage efficiency.

In one embodiment, the conjugate comprises a chemical moiety with RNA cleaving activity coupled to the oligonucleotide at the 5' end of said oligonucleotide and cleavage of the RNA molecule occurs exactly at the 3' end of the target sequence. This is in particular the case if the last nucleotide at the 5' end of the oligonucleotide is a G or a C.

Alternatively, in this setup, cleavage can take place 1, 2 or 3 nucleotides upstream or downstream from the 3' end of the target sequence, wherein the exact position can depend on the spacer as used between the chemical moiety with RNA cleaving activity and the oligonucleotide. In another embodiment, the conjugate comprises a chemical moiety with RNA cleaving activity coupled to the oligonucleotide at the 3' end of said oligonucleotide and cleavage of the RNA molecule occurs exactly at the 5' end of the target sequence. This is in particular the case if the last nucleotide at the 3' end of the oligonucleotide is a G or a C. Alternatively, in this setup, cleavage can take place 1, 2 or 3 nucleotides upstream or downstream from the 5' end of the target sequence, wherein the exact position can depend on the spacer as used between the chemical moiety with RNA cleaving activity and the oligonucleotide.

Preferably, the method as provided herein has a conversion efficiency of at least about 30%, about 35%, about 40%, about 45%, about 50%, about 55%, about 60%, about 65%, about 70%, about 75%, about 80%, about 85%, about 90%, or about 95% or even more. The term "conversion efficiency" has to be understood as the fraction (expressed in %) of RNA molecule that has been cleaved by the conjugate. In other words, the term "conversion efficiency" has to be understood as the fraction of RNA molecules (expressed in %) that have been converted into at least one or more of RNA fragments.

In one embodiment, the method is for analyzing one of more of the fragments obtained for their length.

In one embodiment, the method is for analyzing one of more of the fragments obtained for their mass.

Second Aspect: Methods for Analyzing the 5' Region of an RNA Molecule

In a second aspect, the present invention provides a method for analyzing the 5' region of an RNA molecule comprising the following steps:
(i) providing an RNA molecule;
(ii) providing at least one conjugate comprised of a chemical moiety with RNA cleaving activity and an oligonucleotide, wherein the sequence of said oligonucleotide is complementary to a target sequence of the RNA molecule;
(iii) cleaving the RNA molecule provided in step (i) to obtain a 5' RNA fragment by contacting the RNA molecule with the at least one conjugate provided in step (ii) under conditions allowing the hybridization of said oligonucleotide to said target sequence and the cleavage of the RNA molecule; and
(iv) determining a physical property of the 5' RNA fragment obtained in step (iii).

The method according to the second aspect thus focuses on the analysis of the 5' region, in particular the 5' end, of an RNA molecule. For example, the method may be directed to the analysis of the presence and/or integrity of the 5' cap structure, the methylation pattern of the 5' cap structure, the orientation of the 5' cap structure and/or the nucleotide composition of the 5' region.

Thus, in one embodiment of the second aspect, there is provided a method for analyzing the presence and/or integrity of the 5' cap structure and/or the methylation pattern of the 5' cap structure and/or the orientation of the 5' cap structure and/or the nucleotide composition of the 5' region of an RNA molecule comprising the following steps:
(i) providing an RNA molecule;
(ii) providing at least one conjugate comprised of a chemical moiety with RNA cleaving activity and an oligonucleotide, wherein the sequence of said oligonucleotide is complementary to a target sequence of the RNA molecule;
(iii) cleaving the RNA molecule provided in step (i) to obtain a 5' RNA fragment by contacting the RNA molecule with the at least one conjugate provided in step (ii) under conditions allowing the hybridization of said oligonucleotide to said target sequence and the cleavage of the RNA molecule; and
(iv) determining a physical property of the 5' RNA fragment obtained in step (iii), preferably by analytical HPCL and/or mass-spectrometry.

The method of the second aspect includes a method for analyzing the 5' capping efficiency of an mRNA molecule comprising the following steps:
(i) providing an mRNA molecule;
(ii) providing at least one conjugate comprised of a chemical moiety with RNA cleaving activity and an oligonucleotide, wherein the sequence of said oligonucleotide is complementary to a target sequence of the mRNA molecule, wherein said target sequence is close to the 5' end of the mRNA;
(iii) cleaving the mRNA molecule provided in step (i) to obtain a 5' RNA fragment by contacting the RNA molecule with the at least one conjugate provided in step (ii) under conditions allowing the hybridization of said oligonucleotide to said target sequence and the cleavage of the RNA molecule; and
(iv) determining the 5' capping efficiency of the mRNA molecule by analyzing the 5' mRNA fragment obtained in step (iii) for the presence or absence of a 5' cap.

In this method, the 5' capping efficiency correlates with the ratio of presence of a 5' cap ("capped RNA")/absence of a 5' cap ("un-capped RNA"), i.e. the higher this ratio, the higher the 5' capping efficiency. The 5' capping assay resulting in the 5' cap (which is carried out prior to the present method and not part of the present method) may be carried out as described below in the definition-section of the present application.

"Capped RNA" includes, for example, 5' m7GpppN (Cap0) and 5' m7GpppmN (Cap1) structures. "Uncapped RNA" includes, for example, reverse capped RNA such as 5' pm7GN (reverse Cap), and uncapped structures such as 5' pppN (uncapped triphosphate), 5' ppN (uncapped diphosphate), and 5' pN (uncapped monophosphate) structures, or intermediate Cap structures such as as 5' pppmN (Cap1 triphosphate), 5' ppmN (Cap1 diphosphate), and 5' pmN (Cap1 monophosphate) structures.

In one embodiment, the 5' capping efficiency is expressed by the ratio of presence of a 5' cap0 structure (m7GpppN)/absence of a 5' cap0 structure, i.e. the higher this ratio, the higher the 5' capping efficiency. The 5' capping assay resulting in the 5' cap (which may be carried out prior to the present method and is not part of the present method) may be carried out as described below in the definition-section of the present application.

In another embodiment, the 5' capping efficiency correlates with the ratio of presence of a 5' cap1 structure (m7GpppmN)/absence of a 5' cap1 structure, i.e. the higher this ratio, the higher the 5' capping efficiency. The 5' capping assay resulting in the 5' cap (which may be carried out prior to the present method and is not part of the present method) may be carried out as described below in the definition-section of the present application.

As capping efficiency or capping degree of an mRNA molecule is associated with translation efficiency of the mRNA in a cell (non-capped or reverse capped mRNA is not translated into protein), the analysis of 5' capping efficiency provides information about the translation capacity or functionality of a (therapeutic) mRNA.

In one embodiment, the 5' fragment is separated from other fragment(s) before analysis in step (iv). In another embodiment, the 5' fragment is separated from the at least one conjugate. In yet another embodiment, the 5' fragment is separated from other fragment(s) and from the at least one conjugate.

The fragments and the conjugate(s) may be separated by any suitable method as set out in the first aspect above.

In a particularly preferred embodiment, the fragments and/or the conjugate(s) are separated by oligo-dT based capturing column chromatography. Oligo-dT based capturing column chromatography may in particular make use of oligo-dT oligonucleotides coupled to a solid support, where polyA-containing fragments bind to the oligo-dT oligonucleotides and can thereby be selectively captured by the column, whereas 5' cap structure comprising fragments, that do not comprise polyA-sequences, run through. Such a step is suitable for removing 3' terminal fragments, thereby improving the analysis of the 5' fragment.

The presence and/or integrity of a 5' cap structure may in particular be analyzed by analytical mass spectrometry. The length of the 5' fragment has been set out above in the first aspect.

For the present aspect, the target sequence is close to the 5' end of the RNA molecule. This is generally set out in FIG. 3A. In one embodiment, the target sequence is located adjacent to the 5' cap, namely on the 3' side of the 5' cap (i.e. downstream). In generally preferred embodiments, the target sequence may be about 1 to about 25 nucleotides downstream of the 5' cap. Accordingly, after cleaving the RNA molecule, a 5' fragment of about 1 to about 25 nucleotides in length is generated. In the present aspect, it can be preferred to have the chemical moiety with RNA cleaving activity coupled to the oligonucleotide at the 3' end of said oligonucleotide such that the cleavage takes place at or close to the 5' end of the target sequence. However, this is not mandatory and a coupling to the 5' end of the oligonucleotide also works, see e.g. FIG. 3A.

All further embodiments described above for the method according to the first aspect, except for embodiments involving the analysis of the 3' fragment and/or the analysis of one or more central fragments, equally apply to the method according to the second aspect. Accordingly, it is particularly preferred that the RNA molecule is an mRNA molecule.

Third aspect: method for analyzing the 3' region of an RNA molecule

In a third aspect, the present invention provides a method for analyzing the 3' region of an RNA molecule comprising the following steps:
(i) providing an RNA molecule;
(ii) providing at least one conjugate comprised of a chemical moiety with RNA cleaving activity and an oligonucleotide, wherein the sequence of said oligonucleotide is complementary to a target sequence of the RNA molecule;
(iii) cleaving the RNA molecule provided in step (i) to obtain a 3' RNA fragment by contacting the RNA molecule with the at least one conjugate provided in step (ii) under conditions allowing the hybridization of said oligonucleotide to said target sequence and the cleavage of the RNA molecule; and
(iv) determining a physical property of the 3' RNA fragment obtained in step (iii).

The method according to the third aspect thus focuses on the analysis of the 3' region of an RNA molecule. For example, the method may be directed to the analysis of the length and/or nucleotide composition of the 3' region, in particular the homopolymeric sequence, of an RNA molecule.

Thus, in one embodiment of the third aspect, there is provided a method for analyzing the length and/or nucleotide composition of the 3' region of an RNA molecule comprising the following steps:
(i) providing an RNA molecule;
(ii) providing at least one conjugate comprised of a chemical moiety with RNA cleaving activity and an oligonucleotide, wherein the sequence of said oligonucleotide is complementary to a target sequence of the RNA molecule;
(iii) cleaving the RNA molecule provided in step (i) to obtain a 5' RNA fragment by contacting the RNA molecule with the at least one conjugate provided in step (ii) under conditions allowing the hybridization of said oligonucleotide to said target sequence and the cleavage of the RNA molecule; and
(iv) determining a physical property of the 5' RNA fragment obtained in step (iii), preferably by analytical HPCL and/or mass-spectrometry.

As length and/or nucleotide composition of the 3' homopolymeric, preferably polyA, sequence of an mRNA is associated with translation efficiency of an mRNA in a cell, the analysis of 3' homopolymeric region provides information about the translation capacity or functionality of a (therapeutic) mRNA.

It is preferred that the above method is for analyzing the length and/or nucleotide composition of the 3' homopolymeric, preferably polyA, sequence of an mRNA. In this embodiment, it is particularly preferred that the cleavage is carried out after the last nucleotide before the homopolymeric sequence by designing the conjugate comprised of a chemical moiety with RNA cleaving activity and the oligonucleotide accordingly.

In one embodiment, the 3' fragment is separated from other fragment(s) before analysis in step (iv). In another embodiment, the 3' fragment is separated from the at least one conjugate. In yet another embodiment, the 3' fragment is separated from other fragment(s) and from the at least one conjugate.

The fragments and the conjugate(s) may be separated by any suitable method as set out in the first aspect above. In a particularly preferred embodiment, the fragments and/or the conjugate(s) are separated by oligo-dT based capturing column chromatography. Oligo-dT based capturing column chromatography may in particular make use of oligo-dT oligonucleotides coupled to a solid support, where polyA-containing fragments bind to the oligo-dT oligonucleotides and can thereby be captured by the column, whereas fragments not comprising polyA-sequences run through. The captured polyA-containing fragments, which may also be referred to as 3' fragments, may then be eluted and are accordingly then separated from other fragments.

The 3' fragment may be analyzed for its nucleotide composition and/or its length by complete hydrolysis of the 3' fragment followed by analysis of the individual nucleotides gained thereby. Analysis can be carried out by analytical HPLC or analytical mass spectrometry. The length of the 3' fragment has been set out above in the first aspect.

For the present aspect, the target sequence is close to the 3' end of the RNA molecule. In one embodiment, a target sequence is located adjacent to the 3' homopolymeric sequence, namely on the 5' side of the homopolymeric sequence (i.e. upstream). In other embodiments, the target sequence may be about 50 to about 250 nucleotides upstream of the 3' terminus. Accordingly, after cleaving the RNA molecule, a 3' fragment of about 50 to about 250 nucleotides in length is generated. In the present aspect, it can be preferred to have the chemical moiety with RNA cleaving activity coupled to the oligonucleotide at the 5' end of said oligonucleotide such that the cleavage takes place close to the 3' end of the target sequence, more preferably at the beginning of the homopolymeric sequence at the 3' end. This is schematically shown in FIG. 3B but a coupling at the 3' end of the oligonucleotide is also feasible.

All further embodiments described above for the method according to the first aspect, except for embodiments involving the analysis of the 5' fragment and/or the analysis of one or more central fragments, equally apply to the method according to the third aspect. Accordingly, it is particularly preferred that the RNA molecule is an mRNA molecule.

Fourth Aspect: Method for Analyzing a Population of RNA Molecules, Wherein the RNA Molecules Comprise Identical Target Sequences In a fourth aspect, the present invention provides a method for analyzing a population of RNA molecules comprising the following steps:
(i) providing a population of RNA molecules, wherein the population of RNA molecules comprises at least two different types of RNA molecules, wherein the different types of RNA molecules comprise an identical target sequence;
(ii) providing a conjugate comprised of a chemical moiety with RNA cleaving activity and an oligonucleotide, wherein the sequence of said oligonucleotide is complementary to the target sequence;
(iii) cleaving the population of RNA molecules provided in step (i) to obtain RNA fragments by contacting the RNA molecules with the conjugate provided in step (ii) under conditions allowing the hybridization of said oligonucleotide to said target sequence and the cleavage of the RNA molecules; and
(iv) determining a physical property of the RNA molecules in the population by analyzing one or more of the RNA fragments obtained in step (iii).

The method according to the fourth aspect is directed to a population of RNA molecules, in particular a mixture of different RNA molecules. Such a population of RNA molecules comprises at least two different types of RNA molecules, i.e. at least two RNA molecules that do not have a sequence identity of 100%. As for the first aspect, the different RNA molecules are known, in particular their (different) sequences are known. Yet, according to the fourth aspect, all RNA molecules of the population comprise an identical target sequence. Hence, the entire population can be cleaved by using one type of conjugate.

The method according to the fourth aspect is advantageous since a population of RNA molecules can be analyzed without having to separate the different types of RNA molecules present in the population prior to analysis. For example, this method allows analyzing the percentage of RNA molecules within a population of RNA molecules comprising a 5' cap structure.

All embodiments described above for the method according to the first aspect equally apply to the method according to the fourth aspect. It is explicitly noted that this also includes the embodiments of the first aspect relating to the conjugate as defined herein. Further, insofar as a population is to be analyzed with respect to the 5' region of the different types of RNA molecules, the embodiments of the second aspect equally apply. Still further, insofar as a population is to be analyzed with respect to the 3' region of the different types of RNA molecules, the embodiments of the third aspect equally apply. Accordingly, it is particularly preferred that the RNA molecules are mRNA molecules.

Fifth aspect: method for analyzing a population of RNA molecules, wherein the RNA molecules comprise different target sequences In a fifth aspect, the present invention provides a method for analyzing a population of RNA molecules comprising the following steps:
  (i) providing a population of RNA molecules, wherein the population of RNA molecules comprises at least two different types of RNA molecules, wherein the different types of RNA molecules comprise different target sequences;
  (ii) providing at least two conjugates comprised of a chemical moiety with RNA cleaving activity and an oligonucleotide, wherein the oligonucleotide sequence of each conjugate is complementary to one of the different target sequences;
  (iii) cleaving the population of RNA molecules provided in step (i) to obtain RNA fragments by contacting the RNA molecules with the at least two conjugates provided in step (ii) under conditions allowing the hybridization of said oligonucleotides to said target sequences and the cleavage of the RNA molecules; and
  (iv) determining a physical property of the RNA molecules in the population by analyzing one or more of the RNA fragments obtained in step (iii).

The method according to the fifth aspect is directed to a population of RNA molecules, in particular a mixture of different RNA molecules. Such a population of RNA molecules comprises at least two different types of RNA molecules, i.e. at least two RNA molecules that do not have a sequence identity of 100%. As for the first aspect, the different RNA molecules are known, in particular their (different) sequences are known. According to the fifth aspect, the different types of RNA molecules in the population comprise different target sequences. Depending on the number of different target sequences, the method according to the fifth aspect involves a corresponding number of conjugates, wherein the oligonucleotide sequence of each conjugate is complementary to one of the different target sequences. For examples, if two different types of RNA molecules with two different target sequences are present in the population, two corresponding conjugates are required for cleavage.

Similar to the method according to the fourth aspect, the method according to the fifth aspect is advantageous since a population of RNA molecules can be analyzed without having to separate the different types of RNA molecules present in the population prior to analysis. For example, this method allows analyzing the percentage of RNA molecules within a population of RNA molecules comprising a 5' cap structure. Importantly, for the method according to the fifth aspect, the RNA molecules do not need to be designed in a way to comprise identical target sequences. Hence, this method is applicable to any population of RNA molecules.

All embodiments described above for the method according to the first aspect equally apply to the method according to the fifth aspect. It is explicitly noted that this also includes the embodiments of the first aspect relating to the conjugate as defined herein. Further, insofar as a population is to be analyzed with respect to the 5' region of the different types of RNA molecules, the embodiments of the second aspect equally apply. Still further, insofar as a population is to be analyzed with respect to the 3' region of the different types of RNA molecules, the embodiments of the third aspect equally apply. Accordingly, it is particularly preferred that the RNA molecules are mRNA molecules.

Sixth Aspect: A Conjugate Coupled to a Support

According to the sixth aspect of the present invention, the conjugate comprising a chemical moiety with RNA cleaving activity and an oligonucleotide as described above in the first aspect is coupled to a support. The support can be any suitable material including but not limited to agarose, sepharose, a nanobead or nanoparticle, an agarose bead or particle, glass, a glass bead or particle, poly(methyl methacrylate), a microchip, sephadex and silica.

In one embodiment, the oligonucleotide is coupled to the support. In one embodiment, the chemical moiety with RNA cleaving activity and is coupled to the 5' end of the oligonucleotide and the support is coupled to the 3' end of the oligonucleotide. In another embodiment, the chemical moiety with RNA cleaving activity is coupled to the 3' end of the oligonucleotide and the support is coupled to the 5' end of the oligonucleotide. Coupling may also occur via a modified nucleotide present at any position of the oligonucleotide.

Coupling may be carried out by any suitable means including covalent coupling and non-covalent coupling. Examples for covalent coupling include click-chemistry (as described above for the first aspect). Examples for non-covalent coupling include in particular affinity interactions such as the interaction between streptavidin and biotin, or similar interactions.

Seventh Aspect: A Column Comprising a Conjugate Coupled to a Support

In the seventh aspect, the present invention provides a column comprising the conjugate coupled to support according to the sixth aspect.

The column may be any suitable type of column. The column may be of any volume. The column may be attached to a pump. Alternatively, the column may be operated by gravity flow.

Eighth Aspect: A Reactor

In the eighth aspect, the present invention provides a reactor comprising the conjugate coupled to a support according to the sixth aspect or the column according to the seventh aspect.

The reactor may be thermally regulated to maintain a specific temperature and/or to perform temperature shifts or temperature cycles as described above. The reactor may also comprise a pump and tubes for pumping liquid through the column or the solid support.

Ninth Aspect: Uses

In the ninth aspect, several uses are provided.

Thus, the invention provides the use of the conjugate coupled to a support (the sixth aspect), the column (the seventh aspect) or the reactor (the eight aspect) provided herein in a method for analyzing RNA. The method may be any method for RNA analysis. In preferred embodiment, the method is as provided herein.

The method of the first aspect may be used for obtaining an RNA fingerprint or signature profile. For an RNA fingerprint or signature profile, RNA fragments may be obtained and may be analyzed for their size by, for example, gel electrophoresis to result in a particular band pattern. Such band pattern may give information, e.g., regarding the origin of the RNA or regarding the presence of certain mutations. RNA fingerprints or signature profiles allow comparing RNA derived from different sources. In one embodiment, the method is for determining a signature profile of the RNA, comprising comparing the obtained signature profile to a known signature profile for a test RNA. In a further embodiment, the method is for determining a signature profile of RNA by detecting the plurality of fragments; comparing the signature profile with a known RNA signature profile, and determining the quality (e.g. identity) of the RNA based on the comparison of the signature profile with the known RNA signature profile.

In one embodiment, the method is for determining a signature profile of an RNA composition comprising more than one RNA species, comprising comparing the obtained signature profile to a known signature profile for a test RNA composition. In a further embodiment, the method is for determining a signature profile of an RNA composition comprising more than one RNA species by detecting the plurality of fragments; comparing the signature profile with a known RNA signature profile, and determining the quality (e.g. identity) of the RNA based on the comparison of the signature profile with the known RNA signature profile.

For therapeutic RNA, it is an important quality control to precisely identify the RNA (e.g. after production). Such a quality control is often referred to as determining the RNA's "identity". Accordingly, the method of the first aspect may be used for obtaining an RNA fingerprint to determine the identity of a therapeutic RNA.

It is generally possible to use multiple conjugates comprised of a chemical moiety with RNA cleaving activity and different oligonucleotides, wherein the oligonucleotides bind to defined multiple sites of the RNA molecule, allowing for a fingerprint analysis of the complete RNA molecule. It is also possible to use only one conjugate comprising of a chemical moiety with RNA cleaving activity and one oligonucleotide, wherein the oligonucleotide binds to defined multiple sites of the RNA molecule, allowing for a fingerprint analysis of the complete RNA molecule.

Preferably, the obtained RNA fragments do not have the same lengths, and do not have the same lengths as the oligonucleotides, to allow easier distinction during the analysis, which is preferably carried out by analytical HPLC and/or mass-spectrometry. When the fingerprint analysis is carried out by mass spectrometry, the length of the RNA fragments obtained is preferably between about 1 to about 100 nucleotides, more preferably between about to about 50 nucleotides.

The provided methods may be used in the quality control of RNA molecules. In one embodiment, the provided methods are used for determining the percentage of RNA molecules comprising a 5' cap structure or, in other words, the capping efficiency. In one embodiment, the provided methods are used for determining the length and/or composition of the 3' homopolymeric region.

The provided methods may also be used to assess the translation efficiency of an RNA molecule by determining the percentage of RNA molecules comprising a 5' cap structure and/or by determining the length and/or composition of the 3' homopolymeric region as both structures are key elements for efficient in vivo translation of a therapeutic mRNA.

The provided methods may also be used to assess the immunostimulation of an RNA molecule by determining the percentage of RNA molecules comprising a 5' cap structure, as absence of a 5' cap structure can generate unwanted immune stimulation after in vivo administration of a therapeutic mRNA.

BRIEF DESCRIPTION OF THE DRAWINGS

The figures shown in the following are merely illustrative and shall describe the present invention in a further way. These figures shall not be construed to limit the present invention thereto.

DEFINITIONS

Figure 1:
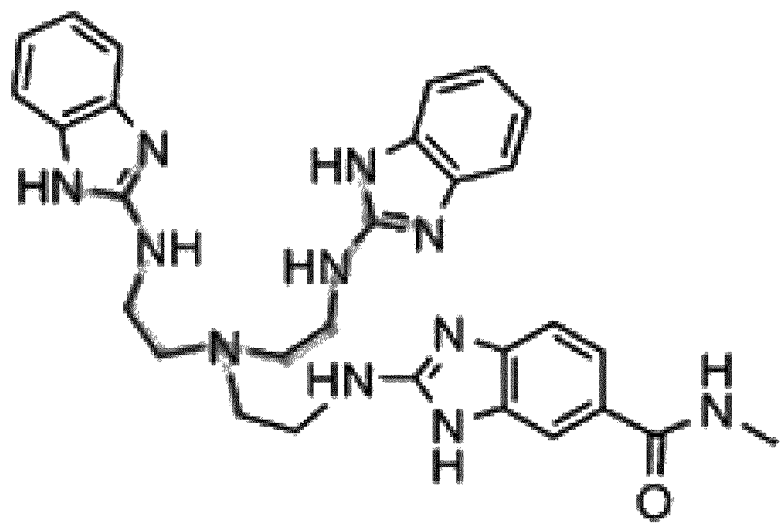
FIG. 1 Chemical structure of tris(2-aminobenzimidazoles); Catalytic core highlighted in grey.
Figure 2:
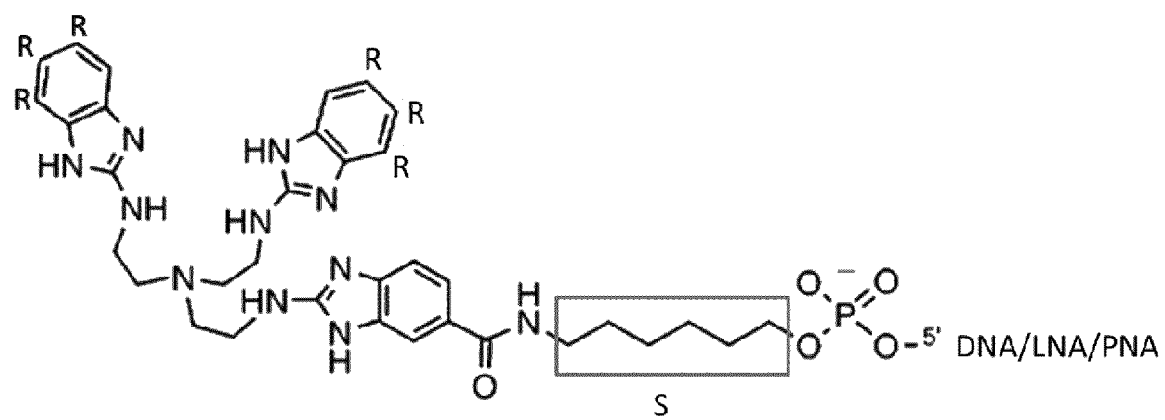
FIG. 2 Generic structure of an oligonucleotide-conjugate with a tris(2-aminobenzimidazoles) modification (S=spacer; R=positions open for substitution).
Figure 3:
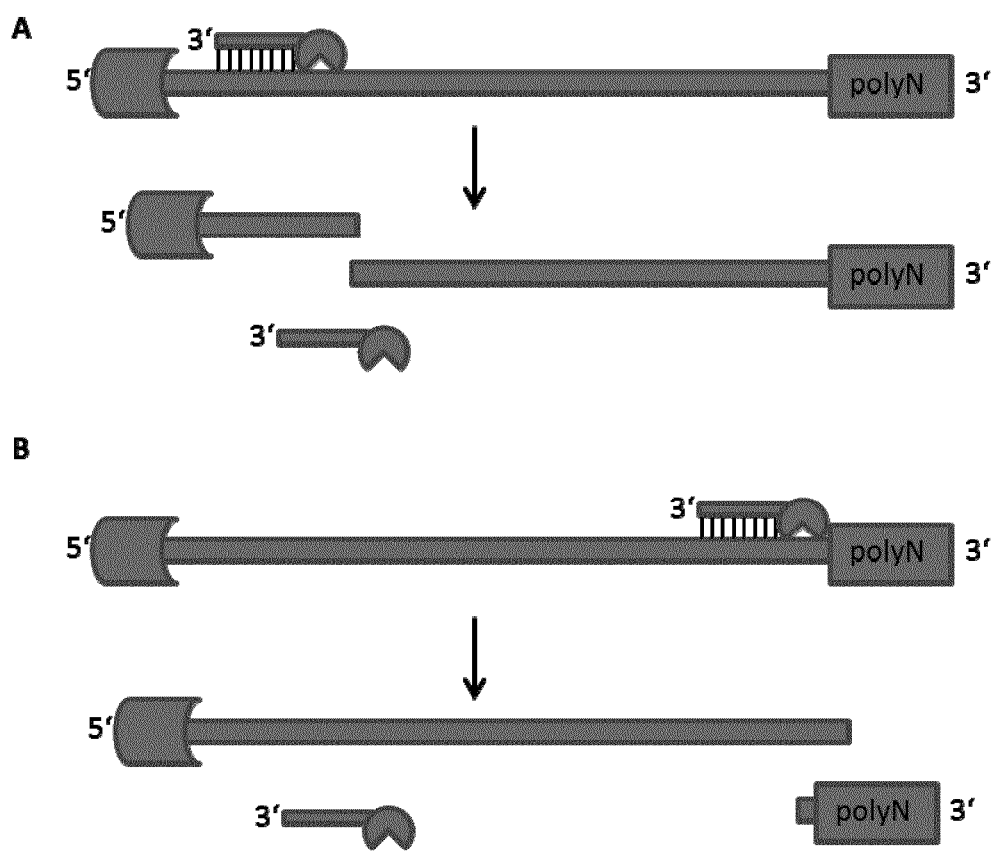
FIG. 3 Schematic drawing illustrating preferred embodiments of the invention. A: 5' analysis; B: 3' analysis. Notably, in other embodiments, the chemical moiety with RNA cleaving activity may be located at the 3' end of the oligonucleotide.

For the sake of clarity and readability the following definitions are provided. Any technical feature mentioned for these definitions may be read on each and every embodiment of the invention. Additional definitions and explanations may be specifically provided in the context of these embodiments.

As used in the specification and the claims, the singular forms of "a" and "an" also include the corresponding plurals unless the context clearly dictates otherwise.

The term "about" in the context of the present invention denotes an interval of accuracy that a person skilled in the art will understand to still ensure the technical effect of the feature in question. The term typically indicates a deviation from the indicated numerical value of +10% and preferably +5%.

It needs to be understood that the term "comprising" is not limiting. For the purposes of the present invention, the term "consisting of" is considered to be a preferred embodiment of the term "comprising". If hereinafter a group is defined to comprise at least a certain number of embodiments, this is also meant to encompass a group which preferably consists of these embodiments only.

The term "nucleic acid" means any DNA- or RNA-molecule and is used synonymous with polynucleotide. An "oligonucleotide" is a polynucleotide of a defined length, usually of a length of about 5 to about 100 nucleotides, but not limited thereto.

The term "DNA" is the usual abbreviation for deoxyribonucleic acid. It is a nucleic acid molecule, i.e. a polymer consisting of nucleotide monomers. These nucleotides are usually deoxy-adenosine-monophosphate, deoxy-thymidine-monophosphate, deoxy-guanosine-monophosphate and deoxy-cytidine-monophosphate monomers or analogs thereof which are—by themselves-composed of a sugar moiety (deoxyribose), a base moiety and a phosphate moiety, and polymerize by a characteristic backbone structure. The backbone structure is, typically, formed by phosphodiester bonds between the sugar moiety of the nucleotide, i.e. deoxyribose, of a first and a phosphate moiety of a second, adjacent monomer. The specific order of the monomers, i.e. the order of the bases linked to the sugar/phosphate-backbone, is called the DNA-sequence. DNA may be single stranded or double stranded. In the double stranded form, the nucleotides of the first strand typically hybridize with the nucleotides of the second strand, e.g. by A/T-base-pairing and G/C-base-pairing.

The term "RNA" is the usual abbreviation for ribonucleic acid. It is a nucleic acid molecule, i.e. a polymer consisting of nucleotide monomers. These nucleotides are usually adenosine-monophosphate, uridine-monophosphate, guanosine-monophosphate and cytidine-monophosphate monomers or analogs thereof, which are connected to each other along a so-called backbone. The backbone is formed by phosphodiester bonds between the sugar, i.e. ribose, of a first and a phosphate moiety of a second, adjacent monomer. The specific order of the monomers, i.e. the order of the bases linked to the sugar/phosphate-backbone, is called the RNA-sequence. The term "RNA" generally refers to a molecule or to a molecule species selected from the group consisting of long-chain RNA, coding RNA, non-coding RNA, single stranded RNA (ssRNA), double stranded RNA (dsRNA), linear RNA (linRNA), circular RNA (circRNA), messenger RNA (mRNA), RNA oligonucleotides, small interfering RNA (siRNA), small hairpin RNA (shRNA), antisense RNA (asRNA), CRISPR/Cas9 guide RNAs, riboswitches, immunostimulating RNA (isRNA), ribozymes, aptamers, ribosomal RNA (rRNA), transfer RNA (tRNA), viral RNA (vRNA), retroviral RNA or replicon RNA, small nuclear RNA (snRNA), small nucleolar RNA (snoRNA), microRNA (miRNA), circular RNA (circRNA), and a Piwi-interacting RNA (piRNA). Preferred in the context of the invention is any type of therapeutic RNA. mRNAs as defined in the following are particularly preferred for the present invention. "Therapeutic RNA" is to be understood as relating to RNA that is suitable for use in the human or animal body for a medical purpose, i.e. it has a clinical grade, particularly when it comes to parameters such as purity, integrity, as well as concerning the underlying production methods that must comply with (c) GMP conditions.

The term "messenger RNA" (mRNA) refer to one type of RNA molecule. In vivo, transcription of DNA usually results in the so-called premature RNA which has to be processed into so-called messenger RNA, usually abbreviated as mRNA. Processing of the premature RNA, e.g. in eukaryotic organisms, comprises a variety of different posttranscriptional modifications such as splicing, 5'-capping, polyadenylation, export from the nucleus or the mitochondria and the like. The sum of these processes is also called maturation of mRNA. The mature messenger RNA usually provides the nucleotide sequence that may be translated into an amino acid sequence of a particular peptide or protein. Typically, a mature mRNA comprises a 5' cap, a 5'UTR, an open reading frame, a 3'UTR and a poly(A) or a poly(C) sequence. In the context of the present invention, an mRNA may also be an artificial molecule, i.e. a molecule not occurring in nature. This means that the mRNA in the context of the present invention may, e.g., comprise a combination of a 5'UTR, open reading frame, 3'UTR and poly(A) sequence, which does not occur in this combination in nature.

The term "population of RNA molecules" or "RNA population" as used herein refers to a plurality of RNA molecules comprised in one mixture or composition. Preferred in the context of the invention is a "population of RNA molecules" or "RNA population" involving any type of therapeutic RNAs.

The term "RNA in vitro transcription" relates to a process wherein RNA is synthesized from a DNA template in a cell-free system (in vitro). DNA, preferably a linear DNA (e.g. linearized plasmid DNA, linearized dbDNA), is used as a template for the generation of RNA transcripts. A DNA template for RNA in vitro transcription may be obtained by cloning of a nucleic acid, in particular cDNA corresponding to the respective RNA to be in vitro transcribed, and introducing it into an appropriate vector for RNA in vitro transcription, e.g. into plasmid DNA. Modified nucleotides may be incorporated during RNA in vitro transcription of the RNA.

The term "3'-untranslated region (3'-UTR)" as used herein refers to the part of an mRNA which is located between the protein coding region (open reading frame (ORF) or coding sequence (CDS)) and the 3' terminus of the mRNA. In the context of the invention, the term 3'-UTR may also comprise elements, which are not encoded in the template, from which an RNA is transcribed, but which are added after transcription during maturation, e.g. a poly(A) sequence (or poly(A) 'tail'). A 3-UTR of the mRNA is not translated into an amino acid sequence. The 3'-UTR sequence is generally encoded by the gene, which is transcribed into the respective mRNA during the gene expression process. The genomic sequence is first transcribed into pre-mature mRNA, which is then further processed into mature mRNA in a maturation process. A 3'-UTR corresponds to the sequence of a mature mRNA, which is located between the stop codon of the protein coding region, preferably immediately 3' to the stop codon of the protein coding region, and the poly(A) sequence of the mRNA.

The term "5'-untranslated region (5'-UTR)" as used herein refers to a particular section of messenger RNA (mRNA). It is located 5' of the open reading frame of the mRNA. Typically, the 5'-UTR starts with the transcriptional start site and ends one nucleotide before the start codon of the open reading frame. The 5'-UTR may comprise elements for controlling gene expression, also called regulatory elements. Such regulatory elements may be, for example, ribosomal binding sites. The 5'-UTR may be post-transcriptionally modified, for example by addition of a 5' cap structure. In the context of the present invention, the term "5'-UTR" typically refers to the sequence of an mRNA, which is located between the 5' cap structure and the start codon. Preferably, the 5'-UTR is the sequence which extends from a nucleotide located 3' to the 5' cap structure to a nucleotide located 5' to the start codon of the protein coding region.

The term "5'-cap structure" as used herein refers to a modified nucleotide, particularly a guanine nucleotide, added to the 5' end of an RNA molecule. The 5' cap may be added using a 5'-5'-triphosphate linkage. A 5' cap may be methylated, e.g. m7GpppN, wherein N is the terminal 5' nucleotide of the nucleic acid carrying the 5' cap, typically the 5'-end of an RNA. The naturally occurring 5' cap is m7GpppN. Further examples of 5'cap structures include glyceryl, inverted deoxy abasic residue (moiety), 4', 5' methylene nucleotide, I-(beta-D-erythrofuranosyl) nucleotide, 4'-thio nucleotide, carbocyclic nucleotide, 1,5-anhydrohexitol nucleotide, L-nucleotides, alpha-nucleotide, modified base nucleotide, threo-pentofuranosyl nucleotide, acyclic 3',4'-seco nucleotide, acyclic 3,4-dihydroxybutyl nucleotide, acyclic 3,5 dihydroxypentyl nucleotide, 3'-3'-inverted nucleotide moiety, 3'-3'-inverted abasic moiety, 3'-2'-inverted nucleotide moiety, 3'-2'-inverted abasic moiety, 1,4-butanediol phosphate, 3'-phosphoramidate, hexylphosphate, aminohexyl phosphate, 3'-phosphate, 3'phosphorothioate, phosphorodithioate, or bridging or non-bridging methylphosphonate moiety. Examples of 5' cap structures are cap1 (additional methylation of the ribose of the adjacent nucleotide of m7G), cap2 (additional methylation of the ribose of the 2nd nucleotide downstream of the m7G), cap3 (additional methylation of the ribose of the 3rd nucleotide downstream of the m7G), cap4 (additional methylation of the ribose of the 4th nucleotide downstream of the m7G).

The term "cap analogue" as used herein will be recognized and understood by the skilled person, and is e.g. intended to refer to a non-polymerizable di-nucleotide or tri-nucleotide that has cap functionality in that it facilitates translation or localization, and/or prevents degradation of a nucleic acid molecule, particularly of an RNA molecule, when incorporated at the 5'-end of the nucleic acid molecule. Non-polymerizable means that the cap analogue will be incorporated only at the 5'-terminus because it does not have a 5' triphosphate and therefore cannot be extended in the 3'-direction by a template-dependent polymerase, particularly, by template-dependent RNA polymerase. Examples of cap analogues include, but are not limited to, a chemical structure selected from the group consisting of m7GpppG, m7GpppA, m7GpppC; unmethylated cap analogues (e.g. GpppG); dimethylated cap analogue (e.g. m2,7GpppG), trimethylated cap analogue (e.g. m2,2,7GpppG), dimethylated symmetrical cap analogues (e.g. m7Gpppm7G), or anti reverse cap analogues (e.g. ARCA; m7,2'OmeGpppG, m7,2'dGpppG, m7,3'OmeGpppG, m7,3'dGpppG and their tetraphosphate derivatives). Further cap analogues have been described previously (WO2008/016473, WO2008/157688, WO2009/149253, WO2011/015347, and WO2013/059475). Further suitable cap analogues in that context are described in WO2017/066793, WO2017/066781, WO2017/066791, WO2017/066789, WO2017/053297, WO2017/066782, WO2018075827 and WO2017/066797 wherein the disclosures referring to cap analogues are incorporated herewith by reference.

Modified cap1 structures may be generated using tri-nucleotide cap analogue as disclosed in WO2017/053297, WO2017/066793, WO2017/066781, WO2017/066791, WO2017/066789, WO2017/066782, WO2018075827 and WO2017/066797. In particular, any cap structures derivable from the structure disclosed in claim 1-5 of WO2017/053297 may be suitably used to co-transcriptionally generate a modified cap1 structure. Further, any cap structures derivable from the structure defined in claim 1 or claim 21 of WO2018075827 may be suitably used to co-transcriptionally generate a modified cap1 structure.

Preferred cap-analogues are the di-nucleotide cap analogues m7G (5') ppp (5') G (m7G) or 3'-O-Me-m7G (5') ppp (5') G to co-transcriptionally generate cap0 structures. Further preferred cap-analogues are the tri-nucleotide cap analogues m7G (5') ppp (5') (2'OMeA) pG or m7G (5') ppp (5') (2'OMeG) pG to co-transcriptionally generate cap1 structures.

5'-cap structures may also be formed via enzymatic capping using capping enzymes (e.g. vaccinia virus capping enzymes and/or cap-dependent 2'-O methyltransferases) to generate cap0 or cap1 or cap2 structures. The 5'-cap structure (cap0 or cap1) may be added using immobilized capping enzymes and/or cap-dependent 2'-O methyltransferases using methods and means disclosed in WO2016/193226.

The terms "poly(A) sequence", "poly(A) tail" or "3'-poly (A) tail" as used herein will be recognized and understood by the skilled person, and are e.g. intended to be a sequence of adenosine nucleotides, typically located at the 3'-end of an RNA, of up to about 1000 adenosine nucleotides. A poly(A) sequence is essentially homopolymeric, e.g. a poly(A) sequence of e.g. 100 adenosine nucleotides has essentially the length of 100 nucleotides. A poly(A) sequence may also be interrupted by at least one nucleotide different from an adenosine nucleotide, e.g. a poly(A) sequence of e.g. 100 adenosine nucleotides may have a length of more than 100 nucleotides (comprising 100 adenosine nucleotides and in addition said at least one nucleotide different from an adenosine nucleotide). A poly(A) sequence may also be segmented, e.g. may comprise more than one homopolymeric stretches of A nucleotides (e.g. at least 30A) and at least one spacer element (also comprising nucleotides different from an adenosine nucleotide). A poly(A) sequence, suitable located downstream of the 3' UTR as defined herein, may comprise about 10 to about 500 adenosine nucleotides, about 10 to about 200 adenosine nucleotides, about 40 to about 200 adenosine nucleotides, or about 40 to about 150 adenosine nucleotides. The length of the poly(A) sequence may be at least about or even more than about 10, 50, 64, 75, 100, 200, 300, 400, or 500 adenosine nucleotides. A poly(A) sequence comprises typically about 50 to about 250 adenosines. A poly(A) sequence may be obtained from a DNA template during RNA in vitro transcription. A poly(A) sequence may also be obtained in vitro by common methods of chemical synthesis without being necessarily transcribed from a DNA template. Alternatively, poly(A) sequences may be generated by enzymatic polyadenylation of the RNA (after RNA in vitro transcription) using commercially available polyadenylation kits and corresponding protocols known in the art, or alternatively, by using immobilized poly(A) polymerases e.g. using a methods and means as described in WO2016/174271.

The term "poly(C) sequence" as used herein will be recognized and understood by the skilled person, and are for example intended to be a sequence of cytosine nucleotides, typically located at the 3'-end of an RNA, of up to about 200 cytosine nucleotides. A poly(C) sequence, suitable located at the 3' terminus downstream of the 3' UTR as defined herein, comprises about 10 to about 200 cytosine nucleotides, about 10 to about 100 cytosine nucleotides, about 20 to about 70 cytosine nucleotides, about 20 to about 60 cytosine nucleotides, or about 10 to about 40 cytosine nucleotides. A poly(C) sequence in the RNA sequence of the present invention may be derived from a DNA template by RNA in vitro transcription. Alternatively, poly(C) sequences may be obtained in vitro by common methods of chemical synthesis, or enzymatically, without being necessarily transcribed from a DNA template.

The term "modified nucleotides" as used herein will be recognized and understood by the person of ordinary skill in the art, and is for example intended to comprise nucleotides that comprise a modification. For example, any nucleotide different from G, C, U, T, A may be regarded as "modified nucleotide". Such modified nucleotides may be incorporated during RNA in vitro transcription of the RNA (e.g. by using pseudouridine (ψ), N1-methylpseudouridine (m1ψ), or 5-methylcytosine, and 5-methoxyuridine instead of uracil in the nucleotide mixture of the transcription reaction). Modified nucleotides known in the art comprise 2-amino-6-chloropurineriboside-5'-triphosphate, 2-Aminopurine-riboside-5'-triphosphate; 2-aminoadenosine-5'-triphosphate, 2'-Amino-2'-deoxycytidine-triphosphate, 2-thiocytidine-5'-triphosphate, 2-thiouridine-5'-triphosphate, 2'-Fluorothymidine-5'-triphosphate, 2'-O-Methyl-inosine-5'-triphosphate 4-thiouridine-5'-triphosphate, 5-aminoallylcytidine-5'-triphosphate, 5-aminoallyluridine-5'-triphosphate, 5-bromocytidine-5'-triphosphate, 5-bromouridine-5'-triphosphate, 5-Bromo-2'-deoxycytidine-5'-triphosphate, 5-Bromo-2'-deoxyuridine-5'-triphosphate, 5-iodocytidine-5'-triphosphate, 5-Iodo-2'-deoxycytidine-5'-triphosphate, 5-iodouridine-5'-triphosphate, 5-Iodo-2'-deoxyuridine-5'-triphosphate, 5-methylcytidine-5'-triphosphate, 5-methyluridine-5'-triphosphate, 5-Propynyl-2'-deoxycytidine-5'-triphosphate, 5-Propynyl-2'-deoxyuridine-5'-triphosphate, 6-azacytidine-5'-triphosphate, 6-azauridine-5'-triphosphate, 6-chloropurineriboside-5'-triphosphate, 7-deazaadenosine-5'-triphosphate, 7-deazaguanosine-5'-triphosphate, 8-azaadenosine-5'-triphosphate, 8-azidoadenosine-5'-triphosphate, benzimidazole-riboside-5'-triphosphate, N1-methyladenosine-5'-triphosphate, N1-methylguanosine-5'-triphosphate, N6-methyladenosine-5'-triphosphate, O6-methylguanosine-5'-triphosphate, pseudouridine-5'-triphosphate, or puromycin-5'-triphosphate, xanthosine-5'-triphosphate. Particular preference is given to nucleotides for base modifications selected from the group of base-modified nucleotides consisting of 5-methylcytidine-5'-triphosphate, 7-deazaguanosine-5'-triphosphate, 5-bromocytidine-5'-triphosphate, and pseudouridine-5'-triphosphate, pyridin-4-one ribonucleoside, 5-aza-uridine, 2-thio-5-aza-uridine, 2-thiouridine, 4-thio-pseudouridine, 2-thio-pseudouridine, 5-hydroxyuridine, 3-methyluridine, 5-carboxymethyl-uridine, 1-carboxymethyl-pseudouridine, 5-propynyl-uridine, 1-propynyl-pseudouridine, 5-taurinomethyluridine, 1-taurinomethyl-pseudouridine, 5-taurinomethyl-2-thio-uridine, 1-taurinomethyl-4-thio-uridine, 5-methyl-uridine, 1-methyl-pseudouridine, 4-thio-1-methyl-pseudouridine, 2-thio-1-methyl-pseudouridine, 1-methyl-1-deaza-pseudouridine, 2-thio-1-methyl-1-deaza-pseudouridine, dihydrouridine, dihydropseudouridine, 2-thio-dihydrouridine, 2-thio-dihydropseudouridine, 2-methoxyuridine, 2-methoxy-4-thio-uridine, 4-methoxy-pseudouridine, and 4-methoxy-2-thio-pseudouridine, 5-aza-cytidine, pseudoisocytidine, 3-methylcytidine, N4-acetylcytidine, 5-formylcytidine, N4-methylcytidine, 5-hydroxymethylcytidine, 1-methyl-pseudoisocytidine, pyrrolo-cytidine, pyrrolo-pseudoisocytidine, 2-thio-cytidine, 2-thio-5-methyl-cytidine, 4-thio-pseudoisocytidine, 4-thio-1-methyl-pseudoisocytidine, 4-thio-1-methyl-1-deaza-pseudoisocytidine, 1-methyl-1-deaza-pseudoisocytidine, zebularine, 5-aza-zebularine, 5-methyl-zebularine, 5-aza-2-thio-zebularine, 2-thio-zebularine, 2-methoxy-cytidine, 2-methoxy-5-methyl-cytidine, 4-methoxy-pseudoisocytidine, and 4-methoxy-1-methyl-pseudoisocytidine, 2-aminopurine, 2,6-diaminopurine, 7-deaza-adenine, 7-deaza-8-aza-adenine, 7-deaza-2-aminopurine, 7-deaza-8-aza-2-aminopurine, 7-deaza-2,6-diaminopurine, 7-deaza-8-aza-2,6-diaminopurine, 1-methyladenosine, N6-methyladenosine, N6-isopentenyladenosine, N6-(cis-hydroxyisopentenyl) adenosine, 2-methylthio-N6-(cis-hydroxyisopentenyl) adenosine, N6-glycinylcarbamoyladenosine, N6-threonylcarbamoyladenosine, 2-methylthio-N6-threonyl carbamoyladenosine, N6, N6-dimethyladenosine, 7-methyladenine, 2-methylthio-adenine, and 2-methoxy-adenine, inosine, 1-methyl-inosine, wyosine, wybutosine, 7-deaza-guanosine, 7-deaza-8-aza-guanosine, 6-thio-guanosine, 6-thio-7-deaza-guanosine, 6-thio-7-deaza-8-aza-guanosine, 7-methyl-guanosine, 6-thio-7-methyl-guanosine, 7-methylinosine, 6-methoxy-guanosine, 1-methylguanosine, N2-methylguanosine, N2,N2-dimethylguanosine, 8-oxo-guanosine, 7-methyl-8-oxo-guanosine, 1-methyl-6-thio-guanosine, N2-methyl-6-thio-guanosine, and N2, N2-dimethyl-6-thio-guanosine, 5'-O-(1-thiophosphate)-adenosine, 5'-O-(1-thiophosphate)-cytidine, 5'-O-(1-thiophosphate)-guanosine, 5'-O-(1-thiophosphate)-uridine, 5'-O-(1-thiophosphate)-pseudouridine, 6-aza-cytidine, 2-thio-cytidine, alpha-thio-cytidine, Pseudo-iso-cytidine, 5-aminoallyl-uridine, 5-iodo-uridine, N1-methyl-pseudouridine, 5,6-dihydrouridine, alpha-thio-uridine, 4-thio-uridine, 6-aza-uridine, 5-hydroxy-uridine, deoxy-thymidine, 5-methyl-uridine, Pyrrolo-cytidine, inosine, alpha-thio-guanosine, 6-methyl-guanosine, 5-methyl-cytdine, 8-oxo-guanosine, 7-deaza-guanosine, N1-methyl-adenosine, 2-amino-6-Chloro-purine, N6-methyl-2-amino-purine, Pseudo-iso-cytidine, 6-Chloro-purine, N6-methyl-adenosine, alpha-thio-adenosine, 8-azido-adenosine, 7-deaza-adenosine, pseudouridine, N1-methylpseudouridine, N1-ethylpseudouridine, 2-thiouridine, 4'-thiouridine, 5-methyluridine, 2-thio-1-methyl-1-deaza-pseudouridine, 2-thio-1-methyl-pseudouridine, 2-thio-5-aza-uridine, 2-thio-dihydropseudouridine, 2-thio-dihydrouridine, 2-thio-pseudouridine, 4-methoxy-2-thio-pseudouridine, 4-methoxy-pseudouridine, 4-thio-1-methyl-pseudouridine, 4-thio-pseudouridine, 5-aza-uridine, dihydropseudouridine, 2'-O-methyl uridine, pseudouridine (ψ), N1-methylpseudouridine (m1ψ), 5-methylcytosine, and 5-methoxyuridine.

The term "fragment" as used herein refers to a part of an underlying complete RNA molecule. Fragments in the context of the present invention are typically (i) a fragment comprising the 5' part of the underlying RNA molecule, (ii) a fragment comprising the 3' part of the underlying RNA molecule, and (iii) one or more central parts of the underlying RNA molecule.

The term "a physical property" (or "physical properties") as used herein refers to a physical property or to a structural feature of an RNA molecule. Where the plural ("physical properties") is used, it may likewise refer to a single property or single feature. Preferably, the expression as used herein refers to a physical property or a structural feature of the RNA molecule, which distinguishes the RNA molecule from other, preferably structurally related, RNA molecule. A physical property or a structural feature may be capable of distinguishing the RNA molecule from a similar, preferably structurally related, RNA molecule lacking the physical property or a structural feature, more preferably from an RNA molecule, which is identical apart from the lacking physical property or the lacking structural feature. Typically, the distinct physical property reflects a structural feature, such as e.g. a distinct molecular weight, charge, specific nucleotide composition or nucleotide modification. As used herein, a physical property or a structural feature may be determined by standard analytical methods known in the art. A physical property or a structural feature may be determined after cleavage of the RNA molecule for one of the obtained fragments. The physical property or structural feature of the fragment obtained by cleavage of the RNA molecule reflects a physical property or a structural feature of the RNA molecule.

The term "LNA nucleotide" as used herein refers to a modified RNA nucleotide. A LNA nucleotide is a locked nucleic acid. The ribose moiety of an LNA nucleotide may be modified with an extra bridge connecting the 2' oxygen and 4' carbon. This bridge locks the ribose in the 3'-endo (North) conformation, which is often found in the A-form duplexes. LNA nucleotides can be mixed with DNA or RNA residues in an oligonucleotide. LNA nucleotides hybridize with DNA or RNA. Oligomers comprising LNA nucleotides are synthesized chemically and are commercially available. The locked ribose conformation enhances base stacking and backbone pre-organization. The presence of LNA nucleotides significantly increases the hybridization properties (melting temperature) of oligonucleotides.

The term "PNA nucleotide" as used herein refers to a modified nucleic acid. DNA and RNA have a deoxyribose and ribose sugar backbone. The backbone of PNA is composed of repeating N-(2-aminoethyl)-glycine units and it is linked by peptide bonds. Therefore, PNAs are depicted like peptides, i.e. from N-terminus to C-terminus. PNAs exhibit a higher binding strength. Thus, long PNA oligomers are usually not required. The main concern of the length of the PNA-oligomers is to guarantee the specificity. PNA oligomers also show greater specificity in binding to complementary DNAs, with a PNA/DNA base mismatch being more destabilizing than a similar mismatch in a DNA/DNA duplex. This binding strength and specificity also applies to PNA/RNA duplexes. PNAs are not easily recognized by either nucleases or proteases and PNAs are also stable over a wide pH range.

The term "complementary" means that a specific sequence is either completely (which may be preferred) or in most parts the complement sequence of an underlying sequence, in the present case of the target sequence. Thus, put in other words, a complement sequence is either 100% identical (which may be preferred) or is identical to a high degree to the complement sequence of an underlying sequence, in the present case of the target sequence. It has been set out above that the sequence of the oligonucleotide is complementary to the target sequence of the RNA molecule to such a degree that the hybridization will take place specifically between the target sequence of the RNA molecule and the oligonucleotide. Accordingly, the sequence of the oligonucleotide is complementary to the target sequence of the RNA molecule to such a degree that no hybridization between a non-target sequence of the RNA molecule and the oligonucleotide takes place. If the target sequence is e.g. 5'-GGGAGAAAGCUUACC-3' (SEQ ID NO: 9), then the complement sequence is in the case of a 100% identity 5'-GGTAAGCTTTCTCCC-3' (SEQ ID NO: 3). If the sequence has a lower identity and differs e.g. in a single nucleotide, it could e.g. be the sequence of 5'-GGTAAGCT-TACTCCC-3' (SEQ ID NO:10), which would nevertheless still hybridize specifically to the target sequence and thus be a "complement" sequence according to the present invention. It is generally preferred that the complement sequence of the oligonucleotide is 100% identical to the complement sequence of the underlying target sequence.

The term "hybridization" as used herein refers to a single stranded DNA or RNA molecule with a specific sequences annealing to a complement sequence of a DNA or RNA molecule. Single stranded DNA can also hybridize with single stranded RNA to result in a DNA/RNA hybrid. Usually, a double-stranded DNA or RNA or a hybrid is stable under physiological conditions. An increase in temperature will usually cause the two hybridized or annealed strands to separate into single strands. A decrease in temperature causes the single stranded DNA and/or RNA molecules to anneal or hybridize to each other. Hybridization involves the formation of base pairs between A and T (or U) nucleotides and G and C nucleotides of the specific sequence and the complement sequence. "Hybridization" is usually carried out under stringent conditions, preferably under high stringency conditions. The term "high stringency conditions" is to be understood such that a specific sequence specifically hybridizes to a complement sequence in an amount that is detectably stronger than non-specific hybridization. High stringency conditions include conditions which distinguish an oligonucleotide with an exact complement sequence, or an oligonucleotide containing only a few mismatched nucleotides (e.g. 1, 2, 3, 4 or 5 mismatched nucleotides), from a random sequence that happens to have a few small complement regions (comprised of e.g. 3 to 4 nucleotides) to the specific sequence. Such small regions of complementarity melt more easily than a longer complement sequence of preferably about 10 to about 25 nucleotides, and high stringency hybridization makes them easily distinguishable. Relatively high stringency conditions include, for example, low salt and/or high temperature conditions, such as provided by about 0.02-0.1 M NaCl or the equivalent, at temperatures of about 50° C. to about 70° C. Such high stringency conditions tolerate little, if any, mismatch between a specific sequence and a complement sequence. It is generally appreciated that conditions can be rendered more stringent by the addition of increasing amounts of formamide.

The term "target sequence" as used herein corresponds to a specific sequence of the RNA molecule. It may be a specific sequence of the RNA molecule that is present only once in the RNA molecule, such as e.g. the specific sequence of 5'-GGGAGAAAGCUUACC-3' (SEQ ID NO: 9). However, the target sequence may also provide for some flexibility, e.g. in that one or more positions in the sequence are not flexible, which is in the above exemplary sequence e.g. 5'-GGGAGAWAGCUUACC-3' (SEQ ID NO: 11), where W is A or U. Accordingly, a complement sequence can also be flexible at the one or more positions, see also above. It is generally preferred that the target sequence is a specific sequence without flexibility.

The term "chemical moiety with RNA cleaving activity" as used herein is defined as a moiety allowing for the hydrolysis of an RNA-phosphodiester bond of an RNA backbone. In principle, the hydrolysis of the RNA backbone may be catalyzed in three different ways: (I) by deprotonation of the 2'-OH-group attacking the phosphorus atom as a nucleophile, (II) by protonation of the 5'-OH-group acting as a leaving group, or (III) by stabilization of the transitionally formed dianionic phosphorane. Thus, a "chemical moiety with RNA cleaving activity" should be able to serve as both acid and base catalyst. In the context of the present invention, the term "chemical moiety with RNA cleaving activity" does not comprise naturally occurring ribonuclease activities of ribozymes, DNAzymes, RNAse, other RNA nucleases etc. Accordingly, the term "chemical moiety with RNA cleaving activity" has to be understood as an artificial moiety with the capability of cleaving RNA.

The term "sequence identity" as used herein means that two sequences are identical if they exhibit the same length and order of nucleotides. The percentage of identity typically describes the extent, to which two sequences are identical, i.e. it typically describes the percentage of nucleotides that correspond in their sequence position to identical nucleotides of a reference sequence. For the determination of the degree of identity, the sequences to be compared are considered to exhibit the same length, i.e. the length of the longest sequence of the sequences to be compared. This means that a first sequence consisting of 8 nucleotides is 80% identical to a second sequence consisting of 10 nucleotides comprising the complete first sequence. In other words, in the context of the present invention, identity of sequences preferably relates to the percentage of nucleotides of a sequence, which have the same position in two sequences having the same length.

The term "reactor" as used herein refers to a vessel wherein a cleavage of an RNA molecule or a population of RNA molecules, optionally combined with a separation, is carried out under specified conditions.

It is noted that the provided methods generally achieve a high cleavage efficiency. Thus, in one embodiment, the method results in cleavage of at least 50% of the RNA molecules. In one embodiment, the method results in cleavage of at least 60% of the RNA molecules. In one embodiment, the method results in cleavage of at least 70% of the RNA molecules. In one embodiment, the method results in cleavage of at least 80% of the RNA molecules. In one embodiment, the method results in cleavage of at least 90% of the RNA molecules. In one embodiment, the method results in cleavage of 95% of the RNA molecules. In one embodiment, the method results in cleavage of at least 99% of the RNA molecules.

Detailed Description of the Findings Underlying the Present Invention

The inventors found that a conjugate comprising a chemical moiety with RNA cleavage activity and an oligonucleotide complementary to a target sequence of an RNA molecule to be analyzed efficiently cleaves an RNA molecule comprising the target sequence. The inventors further found that an RNA molecule can be efficiently cleaved with multiple conjugates at the same time. Further, the derived RNA fragments can subsequently be analyzed for their physical properties. Surprisingly, the conjugates are stable even at high temperatures. This stability allows using the conjugates in methods involving multiple temperature cycles facilitating multiple rounds of hybridization, cleavage and denaturation, thus resulting in a high conversion efficiency. Furthermore, the conjugates may be re-used after separating them from the fragment(s).

Thus, the present inventors found a method for analyzing an RNA molecule, wherein the RNA molecule can easily be cut at a single or at multiple sites without the need to adopt the RNA molecule itself since the cleavage reaction is sequence-specific with respect to the sequence of the RNA molecule. In other words, it is possible to carry out the cleavage at a desired site of the RNA molecule simply by designing the oligonucleotide accordingly, which is comprised in the conjugate together with the chemical moiety with RNA cleavage activity.

The present invention provides an advantageous method for analyzing an RNA molecule. The method can be applied to an RNA molecule (which may also be referred to as "a population of identical RNA molecules") as well as to a population of different RNA molecules (such as in particular mixtures comprising different RNA molecules) without requiring separation of the different RNA molecules prior to analysis. The provided method further allows determining physical properties of the RNA molecule or the different RNA molecules in a population. The analysis may be directed to one specific physical property, e.g. the analysis of the 5' cap structure or the 3' region. The analysis may also be directed to several physical properties, e.g., the analysis of the 5' cap structure and the composition of the 3' region.

Importantly, the provided method allows determining different physical properties of an RNA molecule at the same time. Depending on the desired analysis, the method may be adapted by including additional separation and/or purification steps to ensure an accurate analysis. For example, for analyzing the 3' fragment, the cleavage of the RNA molecule may be followed by suitable purification steps directed at separating the 3' fragment from the 5' fragment and/or any central fragments and the conjugate. A suitable method for purifying a 3 'fragment is e.g. oligo dT-based capturing. Other approaches for separating/purifying fragments are encompassed as well. For example, a 5' fragment and a 3' fragment of different sizes can be purified by HPLC due to their size difference. HPLC also allows removing the conjugate depending on its size.

The method can be further adapted by immobilizing the conjugate on a support and incubating the RNA molecule with the support. Advantageously, in this setup, the conjugate will not be comprised in the resulting fragment fraction(s). Other embodiments are generally also conceivable where the RNA molecule is immobilized on a support (e.g. by oligo-dT based capturing which will bind the 3' end of the RNA molecule to the support). The conjugate (designed to cleave upstream of the 3' end coupled to the support) may be incubated with the immobilized RNA molecule resulting in cleavage. While the 3' fragment will stay on the support, the 5' fragment and any central fragments will be in the elution fraction. The 3' fragment can subsequently be eluted for the solid support. Also by using this approach, the 3' fragment and the 5' fragment are separated from each other.

The provided method is further advantageous as it can in principle be applied to RNA molecules of any sequence and length. The oligonucleotide of the conjugate can easily be designed based on the desired cleavage site within the RNA molecule. Hence, cleavage at virtually any site of an RNA molecule is possible. Therefore, the present method can easily be adapted depending on the RNA molecule to be analyzed and the physical property to be determined.

Taken together, these features make the provided method, means and uses highly advantageous for RNA analysis, in particular in the field of therapeutic RNAs, where the RNAs are administered to the human and/or animal body. As the provided method gives precise answers regarding the physical properties of an RNA molecule, the method is highly suitable for determining compliance of an RNA molecule (or a population thereof, in particular a mixture of RNA molecules) with regulatory requirements.

EXAMPLES

The following Examples are merely illustrative and shall describe the present invention in a further way. These Examples shall not be construed to limit the present invention thereto.

Example 1: Preparation of RNA

A DNA Sequence was Introduced into a Modified pUC19 Derived Vector Backbone to Comprise a 3'-UTR, a Histone-stem-loop structure, a stretch of adenine nucleotides (A64), and a stretch of cytosine nucleotides (C30) at the 3'-terminal end. The DNA plasmid was linearized and transcribed in vitro using DNA dependent RNA polymerase in the presence of a nucleotide mixture and cap analog. Obtained RNA was purified using RP-HPLC. The RNA sequence is provided in the sequence listing and in Table 1.

Example 3: Reaction Optimizations

The inventors found that an oligonucleotide-conjugate harboring a 5' terminal Tris(2-aminobenzimidazole) moiety efficiently cuts a long RNA construct. Accordingly, an oligonucleotide-conjugate with a Tris(2-aminobenzimidazole) moiety may be used in a method for analyzing the 3' and/or 5' terminus of an RNA. As test RNA, the RNA construct with SEQ ID NO: 1 was used.

The following conjugate with 5' terminal Tris(2-aminobenzimidazole) moiety ("Cutter") was used:

5'-Cutter-CGGCTCCCAGCCCTC-3' (SEQ ID NO: 2)

The oligonucleotide was designed to be complementary to a target region located in the RNA sequence. After successful cleavage of the RNA (646 nucleotides), a fragment of approximately 222 nucleotide in size, and a fragment of approximately 424 nucleotide in size was expected to be obtained.

TABLE 1

Construct used in the experiment

| Construct size | RNA ID: R4032 | SEQ ID NOs |
|---|---|---|
| 646 | GGGAGAAAGCUUACCAUGGGCGCCCCCACCCUGCCGCCGGCCUGGCAGCCG UUCCUCAAGGACCACCGCAUCUCGACCUUCAAGAACUGGCCGUUCCUGGAGG GCUGCGCGUGCACCCCGGAGCGGAUGGCCGAGGCCGGCUUCAUCCACUGCC CCACCGAGAACGAGCCGGACCUGGCCCAGUGCUUCUUCUGCUUCAAGGAGCU GGAGGGCUGGGAGCCGGACGACGACCCGAUCGAGGAGCACAAGAAGCACAGC AGCGGCUGCGCCUUCCUGAGCGUGAAGAAGCAGUUCGAGGAGCUGACGCUC GGGGAGUUCCUGAAGCUGGACCGGGAGCGGGCCAAGAACAAGAUCGCGAAG GAGACCAACAACAAGAAGAAGGAGUUCGAGGAGACCGCCAAGAAGGUGCGGC GGGCCAUCGAGCAGCUGGCCGCCAUGGACUGACCACUAGUUAUAAGACUGAC UAGCCCGAUGGGCCUCCCAACGGGCCCUCCUCCCCUCCUUGCACCGAGAUUA AUAAAAAAAAAAAAAAAAAAAAAAAAAAAAAAAAAAAAAAAAAAAAAAAAAAA AAAAAAAAAAUGCAUCCCCCCCCCCCCCCCCCCCCCCCCCCCCCAAAGGCU CUUUUCAGAGCCACCAGAAUU | SEQ ID NO: 1 |

Example 2: Conditions for Analytical HPLC

For analysis, RNA samples were diluted to 0.1 or 0.05 g/L using water for injection (WFI). 10 µl to 20 µL of diluted RNA samples were injected into the HPLC column (monolithic poly(styrene-divinylbenzen) matrix or AQUITY UPLC OST C18 matrix). The IP RP HPLC analysis was performed using the following conditions: Buffer A (0.1 M TEAA (pH 7.0)); Buffer B (0.1 M TEAA (pH 7.0) containing 25% acetonitrile). Gradients are indicated in respective Figures. Chromatograms were recorded at a wavelength of 260 nm. Evaluation of obtained chromatograms was done using Chromeleon software. Equipment used for analytical HPLC is provided in Table 2.

TABLE 2

Materials used for analytical HPLC

| | |
|---|---|
| U3000 UHPLC-System | Thermo Scientific |
| HPLC column (monolithic poly(styrene-divinylbenzen) matrix | Thermo Scientific |
| AQUITY UPLC OST C18 column 2.1 × 50 mm, 1.7 µm particle size | Waters Corporation |
| WFI | Fresenius Kabi, Ampuwa |
| Acetonitril (MS-grade) | Fisher Scientific |
| 0.1M TEAA in WFI (Eluent A) | CureVac AG |
| 25% ACN in 0.1M TEAA (Eluent B) | CureVac AG |

Sequence of the expected 222 fragment, with complementary region highlighted in bold
(SEQ ID NO: 5):
GGGAGAAAGCUUACCAUGGGCGCCCCCACCCUGCCGCCGGCCUGGCAGCC

GUUCCUCAAGGACCACCGCAUCUCGACCUUCAAGAACUGGCCGUUCCUGG

AGGGCUGCGCGUGCACCCCGGAGCGGAUGGCCGAGGCCGGCUUCAUCCAC

UGCCCCACCGAGAACGAGCCGGACCUGGCCCAGUGCUUCUUCUGCUUCAA

GGAGCUGGAGGGCUGGGAGCCG

Sequence of the expected 424 fragment
(SEQ ID NO: 6):
GACGACGACCCGAUCGAGGAGCACAAGAAGCACAGCAGCGGCUGCGCCUU

CCUGAGCGUGAAGAAGCAGUUCGAGGAGCUGACGCUCGGGGAGUUCCUGA

AGCUGGACCGGGAGCGGGCCAAGAACAAGAUCGCGAAGGAGACCAACAAC

AAGAAGAAGGAGUUCGAGGAGACCGCCAAGAAGGUGCGGCGGGCCAUCGA

GCAGCUGGCCGCCAUGGACUGACCACUAGUUAUAAGACUGACUAGCCCGA

UGGGCCUCCCAACGGGCCCUCCUCCCCUCCUUGCACCGAGAUUAAUAAAA

AAAAAAAAAAAAAAAAAAAAAAAAAAAAAAAAAAAAAAAAAAAAAAAAAA

AAAAAAAAAAUGCAUCCCCCCCCCCCCCCCCCCCCCCCCCCCCCCCAAAG

GCUCUUUUCAGAGCCACCAGAAUU

Oligonucleotide conjugate and RNA were incubated in a 50 mM Tris-Puffer (pH 8.0) for about 19 h. To avoid thermal degradation of the RNA, the incubation temperature was set to about 20° C. Different amounts of oligonucleotide conjugate were tested (1 eq (ng/ng), 2 eq (ng/ng), 4 eq (ng/ng), 8 eq (ng/ng)) (eq=mass equivalent).

To improve the hybridization of oligonucleotide conjugate to the RNA, a temperature cycle was introduced (20° C.->80° C. for 20 sec->20° C.), followed by final incubation step at 20° C. for 19 h. The different reaction products were analyzed using analytical HPLC. The results are shown in FIG. 4 and FIG. 5.

Figure 4:
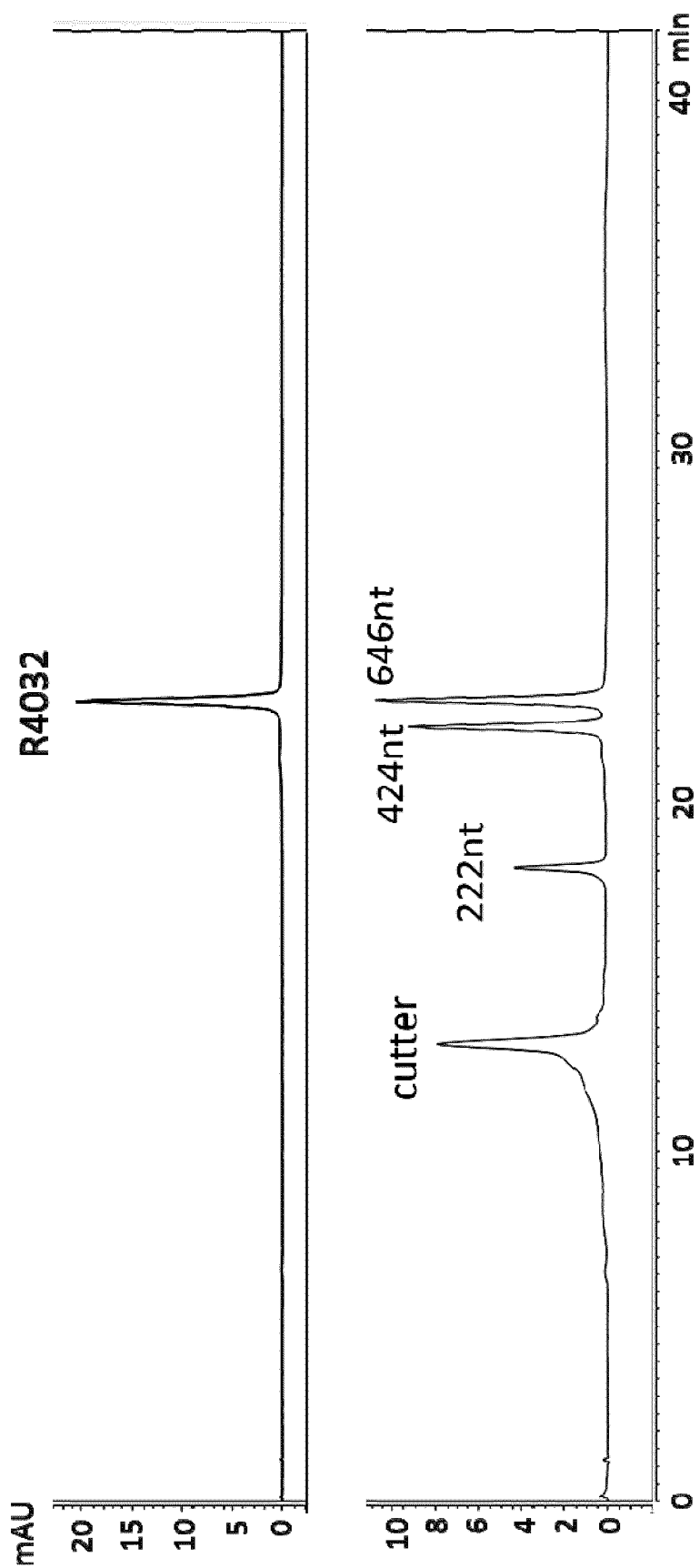
FIG. 4 The top chromatogram shows the undigested target RNA (R4032) before starting the experiment. The bottom chromatogram shows the result after 19h incubation. See Example 3 for details.

As exemplarily shown in FIG. 4, 2eq of oligonucleotide conjugate was sufficient to obtain a 50% digestion of the RNA. In FIG. 4, the chromatogram at the top shows the undigested target RNA (R4032) before starting the experiment. The chromatogram at the bottom shows the result after 19 h incubation time. On analytical HPLC, four fractions were detected, including the oligonucleotide conjugate (first fraction), the two digestion products (second fraction: 222 nt fragment; third fraction: 424 nt fragment) and the undigested RNA (fourth fraction: 646 nt fragment).

Figure 5:
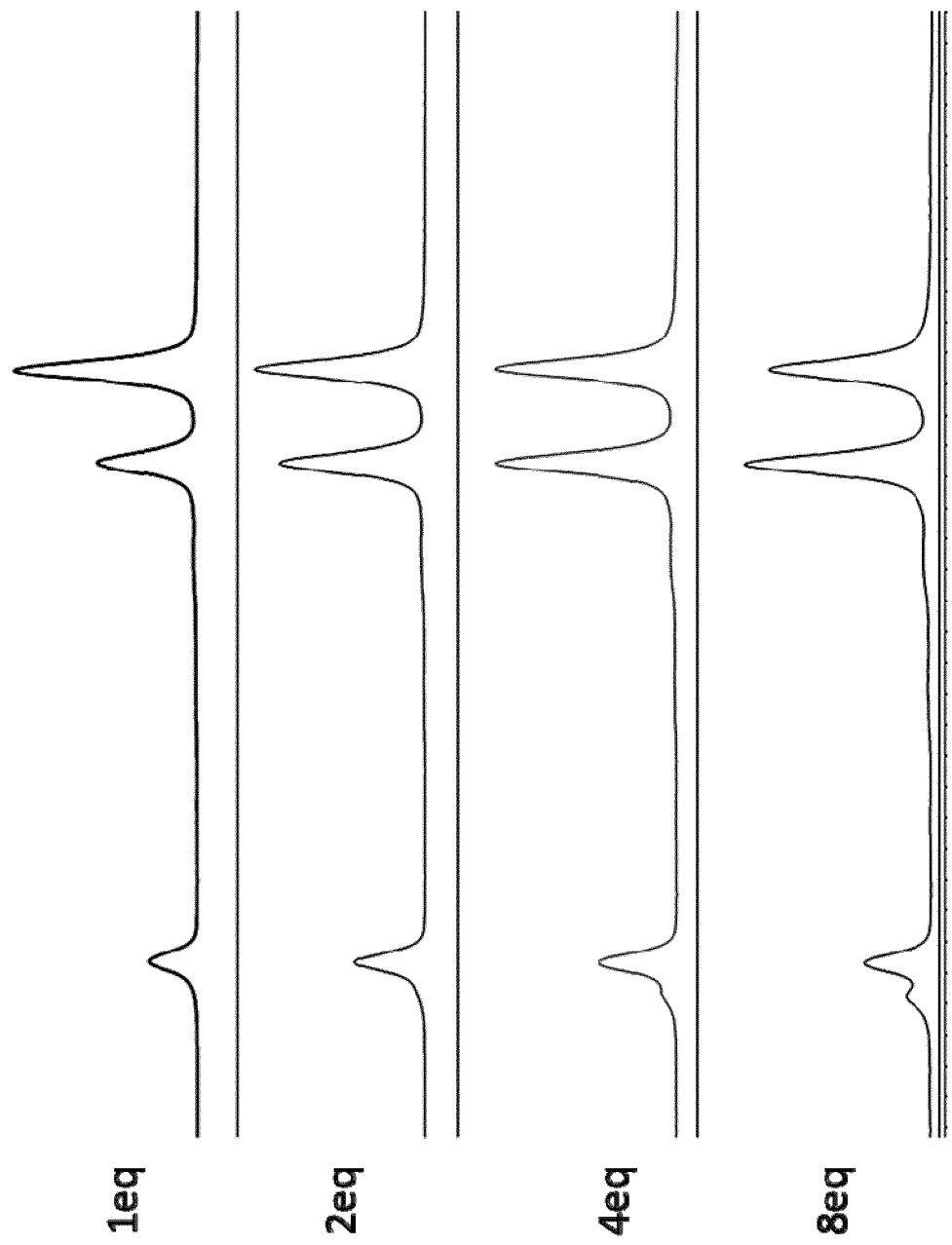
FIG. 5 Sections of chromatograms using different amounts of conjugate (1 eq, 2 eq, 4 eq, 8 eq). See Example 3 for details.

FIG. 5 shows the result (HPLC chromatogram) using different amounts of cutter (1 eq, 2 eq, 4 eq, 8 eq). The conversion of the RNA target could be improved by increasing the amount of oligonucleotide conjugate.

To further optimize the procedure, thermal cycles were introduced during the incubation period. Accordingly, after an initial cycle (20° C.->80° C. for 20 sec->20° C.) the reaction was incubated for 1 h at 20° C. That procedure was repeated 8 times, followed by a final incubation step of 11 h at room temperature. The result is shown in FIG. 6.

Figure 6:
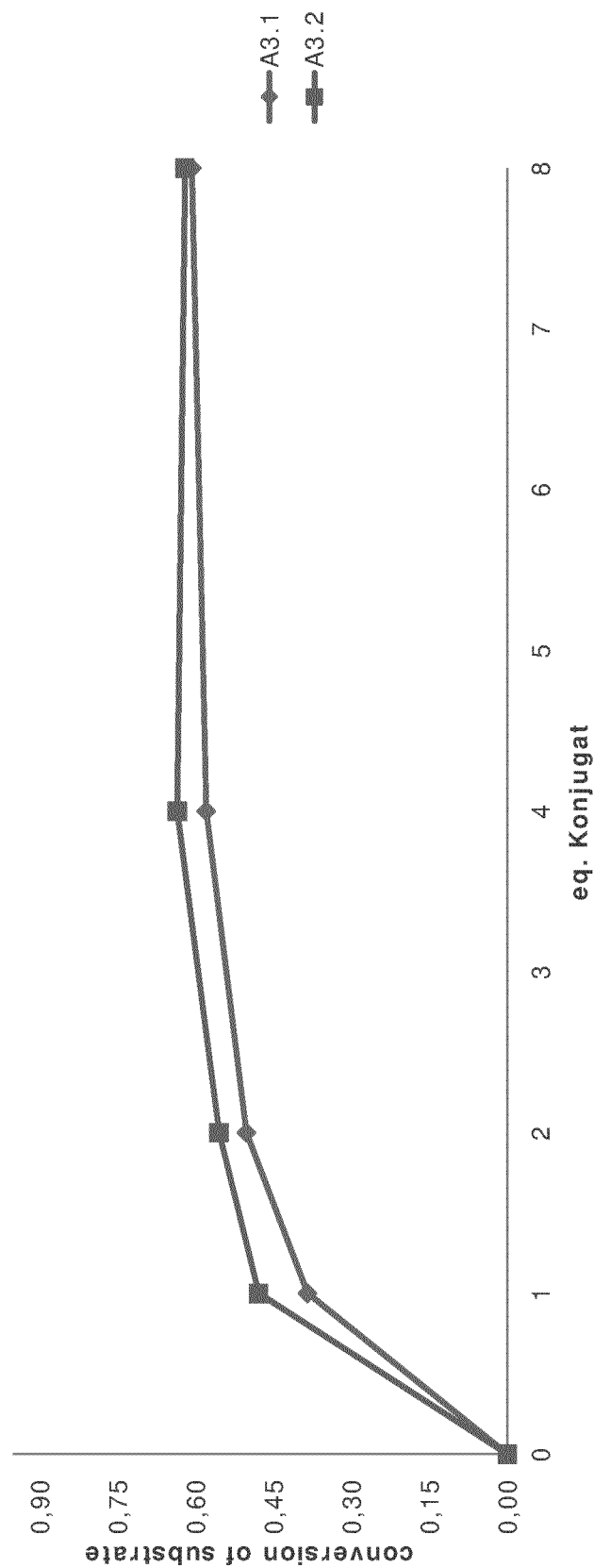
FIG. 6 Plot showing digestion of the RNA under different conditions (dataset A3.1 without and dataset A3.2 with additional thermal cycles). See Example 3 for details.

As FIG. 6 shows, the conversion of the RNA substrate into the two different cleavage products could be increased by introducing additional thermal cycles during the incubation step (dataset A3.2 in FIG. 6) compared to a procedure without additional thermal cycles (dataset A3.1 in FIG. 6). Under the tested conditions, RNA conversion was the best when about 4-5 eq (ng/ng) oligonucleotide conjugate were used, and conversion of the RNA could not be further improved by further increasing the amount of oligonucleotide conjugate in the reaction (6 eq, 7 eq, 8 eq).

Figure 7:
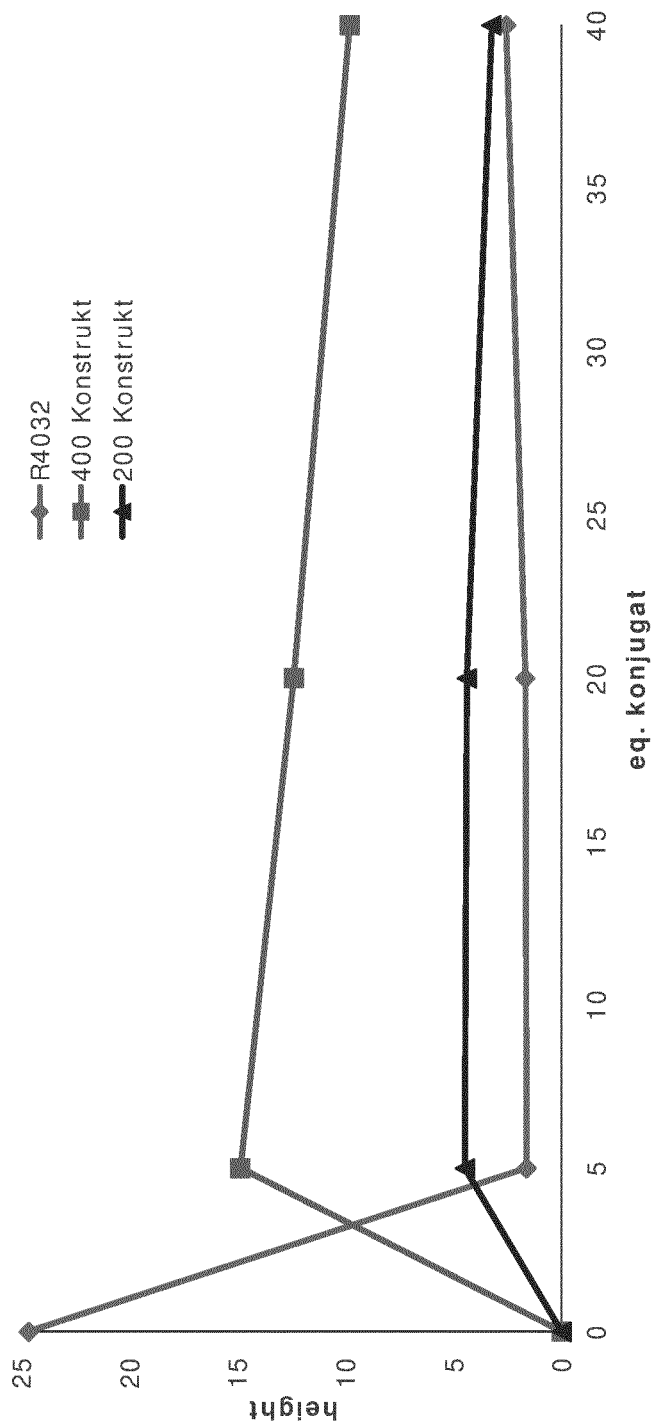
FIG. 7 Plot showing digestion of the RNA for different amounts of conjugate ("400 Konstrukt" is the fragment of 424 nucleotides, whereas "200 Konstrukt" is the fragment of 222 nucleotides). See Example 3 for details.

An increase in incubation time to about 70 h led to a conversion efficiency of about 90% (using 5 eq oligonucleotide conjugate). Again, conversion of the RNA could not be further improved by further increasing the amount of oligonucleotide conjugate in the reaction (10 eq, 15 eq, 20 eq, 25 eq, 30 eq, 35 eq, 40 eq). Further optimizations may be required to reduce the incubation time. The results are shown in FIG. 7 (data points: height of HPLC peaks).

Conclusion/Discussion:

The results show that a conjugate comprising the chemical moiety with RNA cleaving activity and the oligonucleotide can be used for sequence specific digestion of a long RNA construct. Further optimizations that may improve the conversion efficiency of the RNA into the cleavage products may be the temperature profile of the reaction, the buffer conditions of the reaction, the sequence of the oligonucleotide (e.g. implementation of LNA, PNA nucleotides), and/or the implementation of a oligonucleotide conjugate feeding step.

Example 4: Specific Digestion of the 3' Terminus Comprising a Poly(A) and a Poly(C) Stretch The inventors found that a conjugate harboring a 5' terminal Tris(2-aminobenzimidazole) moiety can be used for sequence specific cleavage of the 3' terminus of an RNA. As test RNA, the RNA construct with SEQ ID NO: 1 was used.

The following conjugate with 5' terminal Tris(2-aminobenzimidazole) modification ("Cutter") was used: 5'-Cutter-CTCGGTGCAAGGAGGGGAG-3' (SEQ ID NO: 4)

The oligonucleotide was designed to be complementary to a region in the 3' terminus of the RNA. After successful cleavage of the RNA (646 nucleotides), a 3' terminal fragment of 134 nucleotides in size, and a fragment of 512 nucleotides in size were expected to be obtained.

```
Sequence of the expected 512 nt fragment, with
complementary region highlighted in bold
(SEQ ID NO: 7):
GGGAGAAAGCUUACCAUGGGCGCCCCCACCCUGCCGCCGGCCUGGCAGCC

GUUCCUCAAGGACCACCGCAUCUCGACCUUCAAGAACUGGCCGUUCCUGG

AGGGCUGCGCGUGCACCCCGGAGCGGAUGGCCGAGGCCGGCUUCAUCCAC

UGCCCCACCGAGAACGAGCCGGACCUGGCCCAGUGCUUCUUCUGCUUCAA

GGAGCUGGAGGGCUGGGAGCCGGACGACGACCCGAUCGAGGAGCACAAGA

AGCACAGCAGCGGCUGCGCCUUCCUGAGCGUGAAGAAGCAGUUCGAGGAG

CUGACGCUCGGGGAGUUCCUGAAGCUGGACCGGGAGCGGGCCAAGAACAA

GAUCGCGAAGGAGACCAACAACAAGAAGAAGGAGUUCGAGGAGACCGCCA

AGAAGGUGCGGCGGGCCAUCGAGCAGCUGGCCGCCAUGGACUGACCACUA

GUUAUAAGACUGACUAGCCCGAUGGGCCUCCCAACGGGCCCUCCUCCCCU

CCUUGCACCGAG

Sequence of the expected 3' terminal 134 nt
fragment (SEQ ID NO: 8):
AUUAAUAAAAAAAAAAAAAAAAAAAAAAAAAAAAAAAAAAAAAAAAAAAA

AAAAAAAAAAAAAAAAAAAUGCAUCCCCCCCCCCCCCCCCCCCCCCCCCC

CCCCCCAAAGGCUCUUUUCAGAGCCACCAGAAUU
```

RNA and oligonucleotide conjugate (1 eq, 2 eq, 10 eq, equimolare) were incubated in 50 mM Tris-Puffer (pH 8.0) for 48 h (including 2 temperature cycles carried out as in Example 3). The obtained products were analyzed on HPLC. The analytical HPLC showed 4 distinct peaks: a peak corresponding to the 19 nt oligonucleotide conjugate, a peak corresponding to the 134 nt 3' terminal fragment, a peak corresponding to the 512 nt fragment and a peak corresponding to the target RNA (646nt fragment). The chromatogram is shown in FIG. 8, wherein A indicates 1 eq (resulting in 73% conversion), B indicates 2 eq (resulting in 81% conversion), C indicates 10 eq (resulting in 81% conversion).

Figure 8:
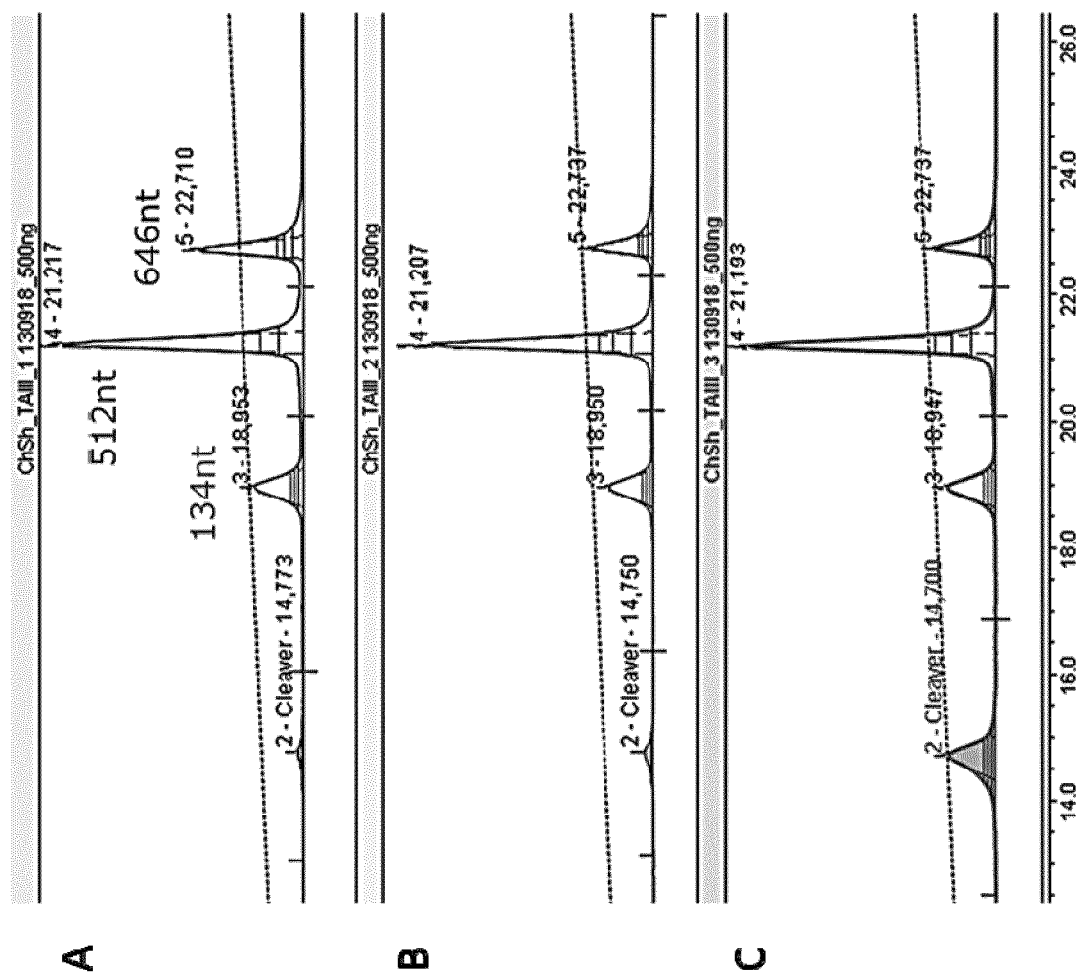
FIG. 8 Chromatogram showing digestion of the RNA for different amounts of conjugate. See Example 5. A: 1 eq used; B: 2 eq used; C: 10 eq used.

Conclusion/Discussion:

As shown in FIG. 8, the sequence specific digestion of the RNA worked, and the 3' terminal fragment of 134 nt size was generated. Notably, the efficiency of conversion was at about 80% when using 2 eq of oligonucleotide conjugate.

As a next step, the 134 nt size fraction can be isolated (e.g. fractionation of HPLC) and subjected to total RNA hydrolysis. The obtained nucleoside hydrolysate can be analyzed on HPLC or MS (total hydrolysis approach is exemplified in WO 2017/149139).

Example 5: Digestion of an RNA Using Multiple Oligonucleotide Conjugates

The inventors found that several oligonucleotide-conjugates can be used in a simultaneous reaction, showing that a simultaneous analysis of the 3' terminus and the 5' terminus is feasible. As test RNA, the RNA construct with SEQ ID NO: 1 was used.

The following conjugates with 5' terminal Tris(2-aminobenzimidazole) moiety ("Cutter") were used simultaneously in one reaction:

5'-Cutter-CGGCTCCCAGCCCTC-3' (SEQ ID NO: 2);
5'-Cutter-GGTAAGCTTTCTCCC-3' (SEQ ID NO: 3);
5'-Cutter-CTCGGTGCAAGGAGGGGAG-3' (SEQ ID NO: 4).

RNA and the above oligonucleotide conjugates were incubated in 50 mM Tris-Puffer (pH 8.0) for 92 h (including 2 temperature cycles carried out as in Example 3). One amount of oligonucleotide conjugate was tested (2 eq)). After successful cleavage of the RNA (646 nucleotides), a 15 nt fragment (5' terminus), a 207 nt fragment, a 290 nt fragment, and a 134 nt fragment (3' terminus) were expected to be obtained.

Figure 9:
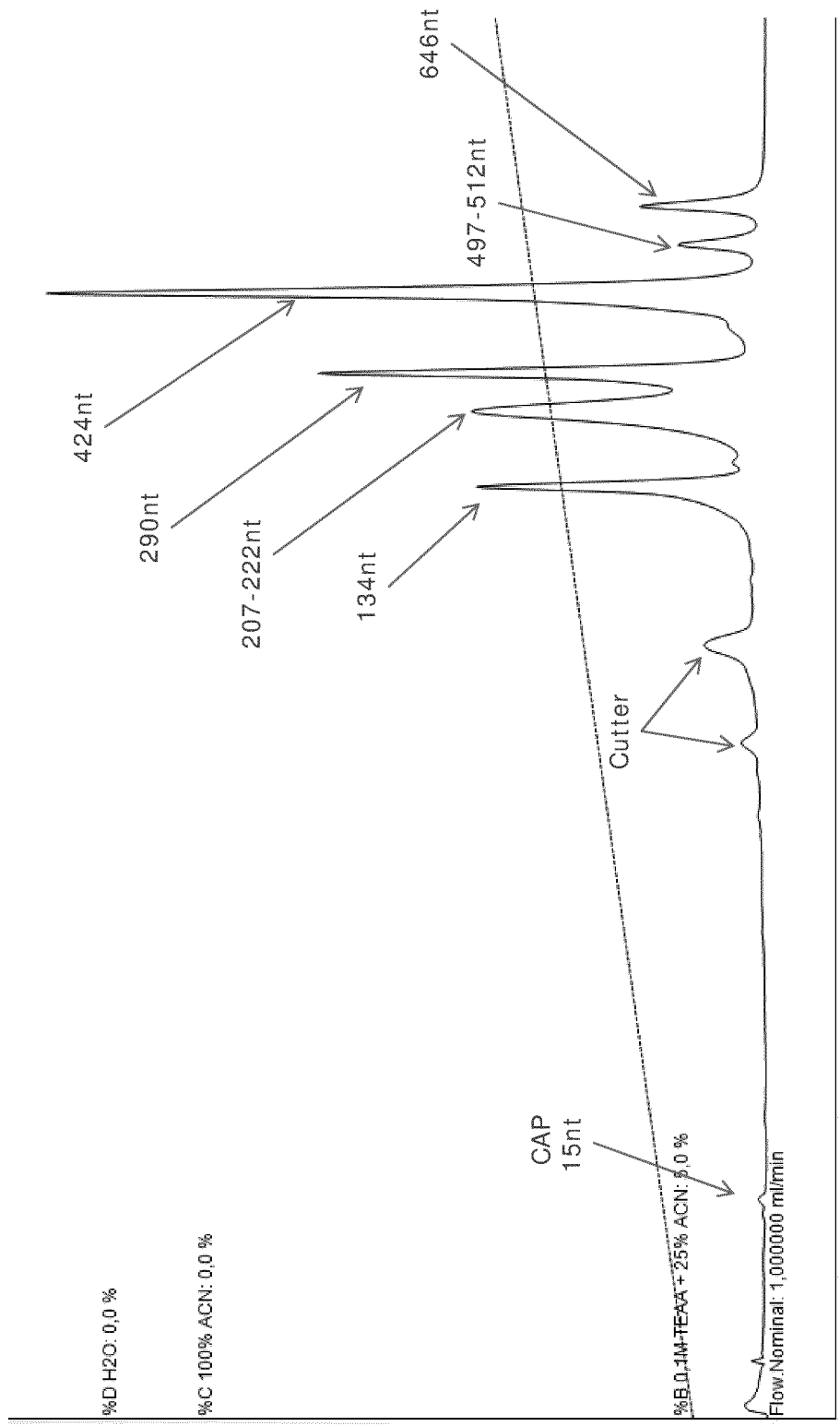
FIG. 9 Chromatogram showing digestion of the RNA using multiple conjugates with products as indicated therein. See Example 5 for details. Chromatogram from 0 to 26 minutes is shown.
Figure 10:
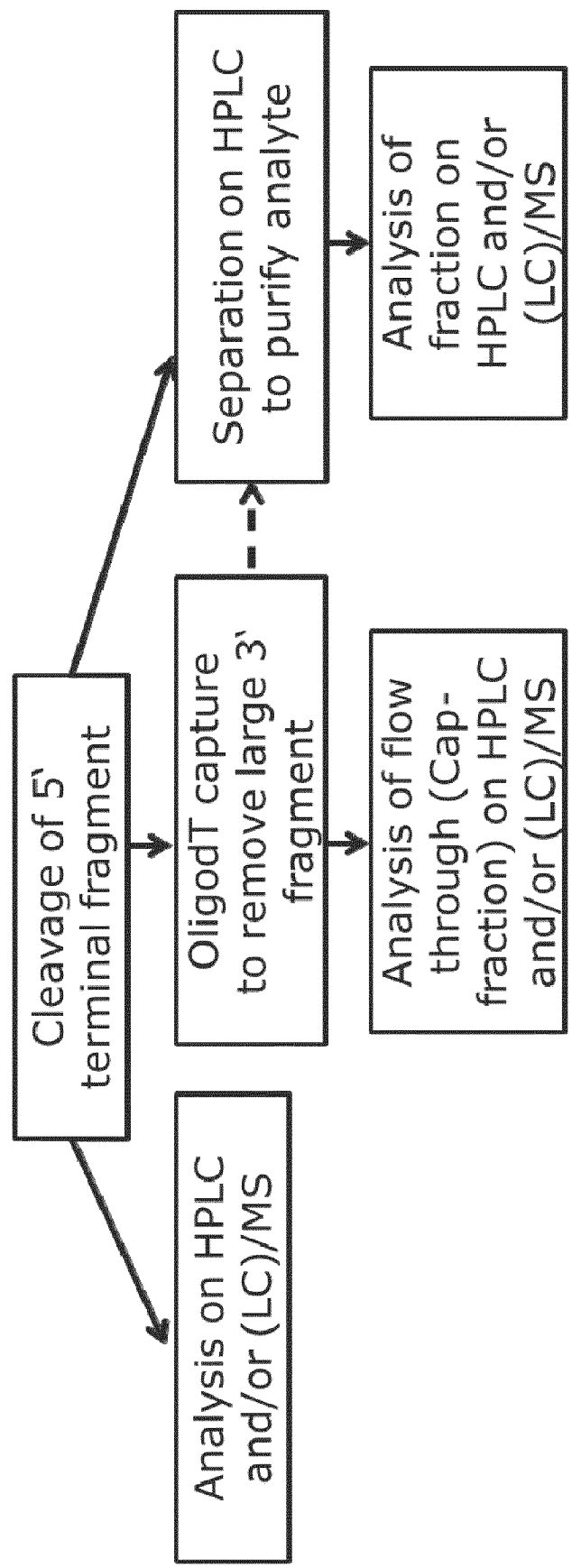
FIG. 10 Schematic overview for analyzing a 5' fragment.
Figure 11:
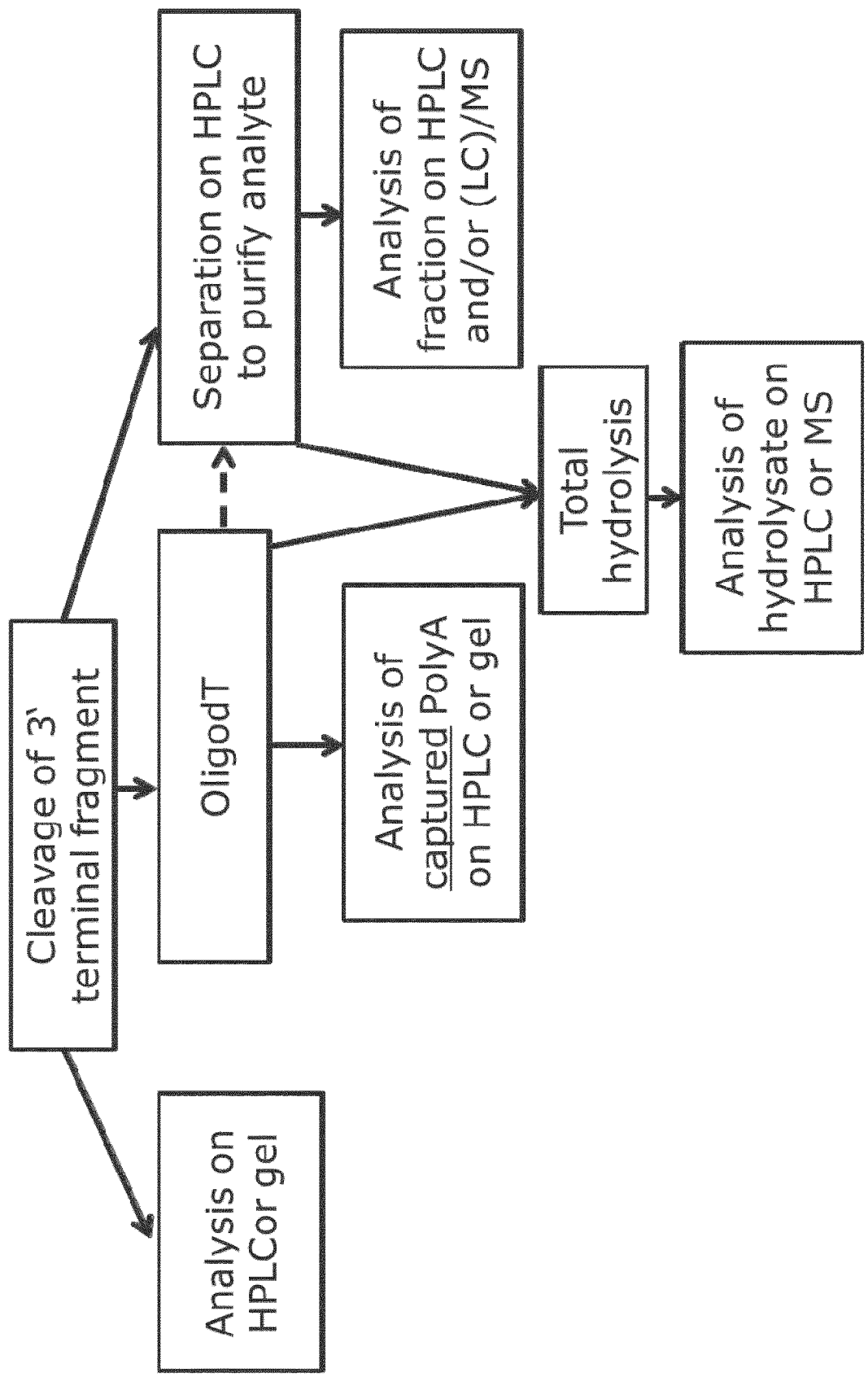
FIG. 11 Schematic overview for analyzing a 3' fragment.
Figure 12:
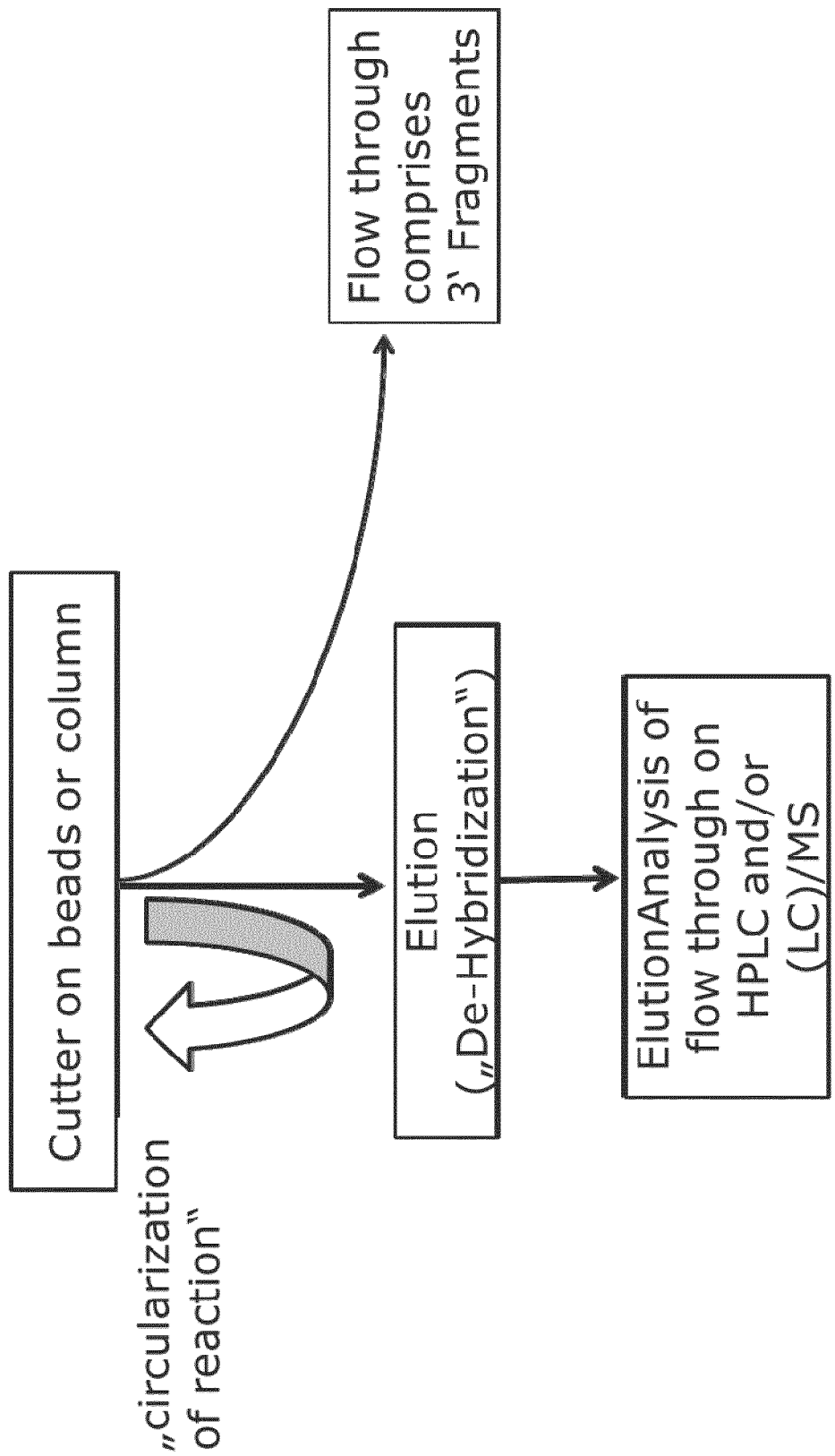
FIG. 12 Schematic overview for analyzing a 5' fragment using immobilized conjugate.
Figure 13:
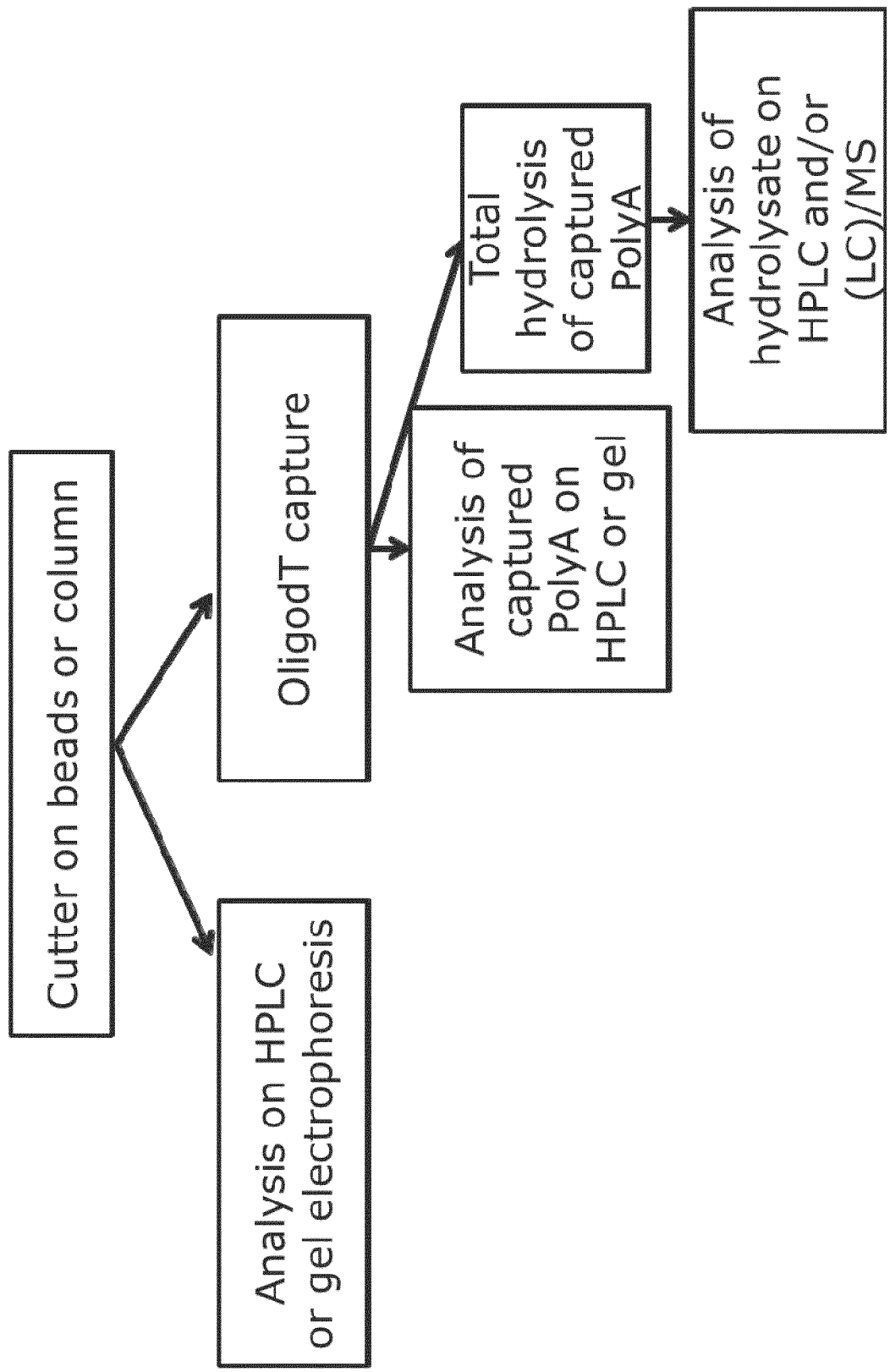
FIG. 13 Schematic overview for analyzing a 3' fragment using immobilized conjugate.

The obtained products were analyzed on HPLC. The analytical HPLC showed that several peaks appeared, wherein the peaks should represent (i) the four expected cleavage products, (ii) the oligonucleotide conjugate ("cutter"), (iii) the undigested RNA, and (iv) cleavage intermediates, as indicated in FIG. 9. The chromatogram is shown in FIG. 9.

Conclusion/Discussion:

Besides the expected RNA cleavage products (15nt fragment (5' terminus), 207nt fragment, 290nt fragment and 134nt fragment (3' terminus)), full length RNA (646nt), oligonucleotide conjugate ("cutter"), and cleavage intermediates were detected. The results exemplarily show that a simultaneous digestion of an RNA using oligonucleotide conjugates is feasible, thus generally allowing fingerprinting approaches as well as a simultaneous analysis of the 5' cap and 3' tail.

Example 6 (Prophetic): Method for the Analysis of RNA Using a Solid Phase Approach An oligonucleotide conjugate harboring a 5' terminal tris(2-aminobenzimidazole) moiety is additionally functionalized at the 3' terminus and immobilized on a solid phase.

Click-chemistry approach: The 3' terminus of the oligonucleotide conjugate comprising a 5' terminal Tris(2-aminobenzimidazole) modification is functionalized with an alkyne (e.g., ethynyl). Next, the obtained oligonucleotide conjugate is subjected to an azide functionalized matrix. Cu(I)-catalyzed azide-alkyne cycloaddition of ethynyl of the oligonucleotide with the azide group of the matrix is performed using BaseClick-Kit biotin (baseclick GmbH) according to the manufacturer's instructions. To prevent damage of the oligonucleotide conjugate by copper ions, the matrix is washed with 70% EtOH and/or 70% EtOH+10 mM EDTA in order to complex the copper ions.

The column comprising immobilized oligonucleotide conjugate is used for cleavage of an RNA construct. To achieve optimal cleavage efficiency, the column is used in an (HP) LC setup, using a flow rate that allows sufficient contact and cleavage of the RNA. Optionally, the digested RNA is collected and re-subjected to the column until sufficient cleavage is obtained (almost 100%). Eventually, the final cleavage product is subjected to HPLC analysis and/or MS and/or total hydrolysis.

Biotin-Streptavidin approach: The 3' terminus of the oligonucleotide conjugate comprising a 5' terminal Tris(2-aminobenzimidazole) modification is functionalized with a biotin moiety. Next, the obtained oligonucleotide conjugate is subjected to a streptavidin matrix. The column comprising immobilized oligonucleotide conjugate is used for cleavage of an RNA construct. To achieve optimal cleavage efficiency, the column is used in an (HP) LC setup, using a flow rate that allows sufficient contact and cleavage of the RNA. Optionally, the digested RNA is collected and re-subjected to the column until sufficient cleavage is obtained (almost 100%). Eventually, the final cleavage product is subjected to HPLC analysis and/or MS and/or total hydrolysis.

Example 7: Fingerprinting of an RNA Molecule Using One Oligonucleotide Conjugate The present example shows that a fingerprinting approach using oligonucleotide conjugates is suitable to distinguish RNA molecules, in particular, similar RNA molecules.

Figures 14, 15:
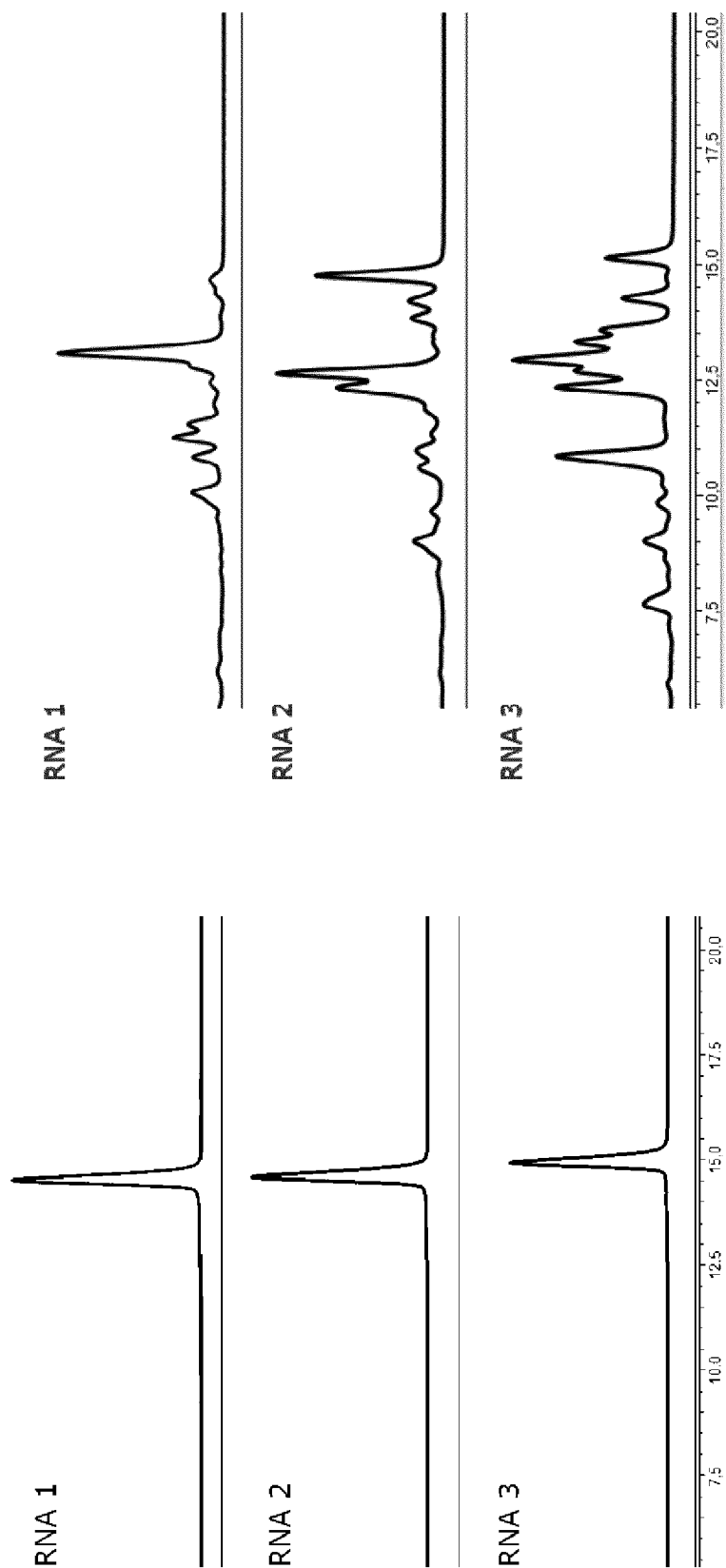
FIG. 14 Exemplary HPLC chromatogram showing undigested RNA 1, RNA 2, RNA 3.
FIG. 15 Exemplary HPLC chromatograms showing a fingerprint/signature profile of RNA 1, RNA 2 and RNA 3 obtained by digestion using a conjugate and RNA molecules with multiple cleavage sites.

FIG. 14 shows chromatograms of three exemplary RNA sequences that have similar retention times on HPLC. FIG. 14 illustrates that, based on HPLC chromatograms, these three different RNA species were not distinguishable from each other. In other words, based on the HPLC chromatogram the identity of the three different RNA species could not be determined.

A finger-printing approach using an oligonucleotide conjugate with multiple cleavage sites within the RNA molecules to be analyzed was developed to distinguish these three different RNA species (RNA 1, RNA 2, RNA 3). The inventors used one oligonucleotide conjugate that has been adapted to hybridize multiple times in the three different RNA molecules. In particular, the oligonucleotide conjugate used for the present experiment comprises four nucleotides that hybridize with complementary RNA motifs within the target RNA sequence. The oligonucleotide includes three DNA nucleotides and one LNA nucleotide exhibiting stronger RNA binding. The oligonucleotide conjugate further comprises a (Tris(2-aminobenzimidazole) at the 5'end for RNA cleavage.

Generally, an oligonucleotide conjugate can be designed for any kind of RNA molecule and any mixture of RNA molecules, depending on the RNA motif at the desired cleavage site(s). For example, in fingerprinting approaches it may be beneficial to use short RNA motifs as binding sites on the target RNA, as such short RNA motifs occur with higher frequency. The introduction of LNA nucleotides exhibiting stronger binding may be used to ensure proper hybridization of the oligonucleotide conjugates on these short RNA motifs.

Each target RNA was digested using said oligonucleotide conjugate under the following conditions.

Reaction buffer: 50 mM Tris, 1 mM EDTA, 50 mM NaCl, pH 8.0.
Molar ratio of each of the at least one conjugates to the RNA molecule: 8:1
Temperature profile: 25° C.->80° C. for 20 sec->25° C. for 2.5h
Temperature cycles: 6

The obtained cleavage products were analyzed on analytical HPLC to obtain unique RNA fingerprints based on the size distribution of the cleavage products (see FIG. 15). As shown in FIG. 15, each cleavage product obtained from the three different RNA species (RNA 1, RNA 2, RNA 3) was distinct (distinct signature profile/finger print). The peaks obtained by analytical HPLC are representative of fully cleaved RNA products and intermediate RNA products. Intermediate RNA products are the result of partial digestion of the RNA molecule to be analyzed. Depending on the reaction conditions, the amount of intermediate RNA products may be increased or decreased. When keeping the reaction conditions constant, the amount of intermediate RNA products will also be constant. Therefore, intermediate RNA products can be part of an RNA fingerprint. Taken together, the inventors found a simple and efficient method to determine the identity of an RNA.

An RNA fingerprint approach either using an oligonucleotide conjugate with multiple cleavage sites within the RNA molecules to be analyzed as described in Example 7, or using more than one oligonucleotide conjugate as described in Example 5, can be used for determining the identity of an RNA e.g. after RNA production. Accordingly, the method can be used as a quality control method to determine the identity of an RNA.

Example 8: Determination of Optimal Cleavage Temperatures

The present example shows that the conversion efficiencies can be improved by increasing the cleavage temperature. Under the conditions of the present Example, the optimal cleavage temperature was in a range of about 35° C. to about 45° C. Furthermore, the example shows that the analysis can surprisingly be performed over various reaction cycles without degrading the RNA and/or without degrading the oligonucleotide conjugate.

Experimental Procedure:

100 pmol RNA of interest (SEQ ID NO: 1) was incubated with 6 equimolar of DNA oligonucleotide conjugate (SEQ ID NO: 2 to perform an RNA analysis assay under the following conditions:
Reaction buffer: 50 mM Tris, 1 mM EDTA, 50 mM NaCl, pH 8.0
Reaction cycles
  Hybridization temperature: 25° C. (annealing temperature)
  Temperature shift up to 85° C., hold for 15 sec (denaturing temperature)
  Down to cleavage temperature: CT=25° C., CT=30° C., CT=35° C., CT=40° C., CT=45° C., CT=50° C. . . . cleavage temperature CT for 2.5 hours
Cycle was repeated 6 times
Reaction time in total: 15 hours
The assay was performed with 6 different cleavage temperatures CT (CT=25° C., CT=30° C., CT=35° C., CT=40° C., CT=45° C., CT=50° C.) to determine the optimal temperature for cleavage of an RNA target.

Figure 16:
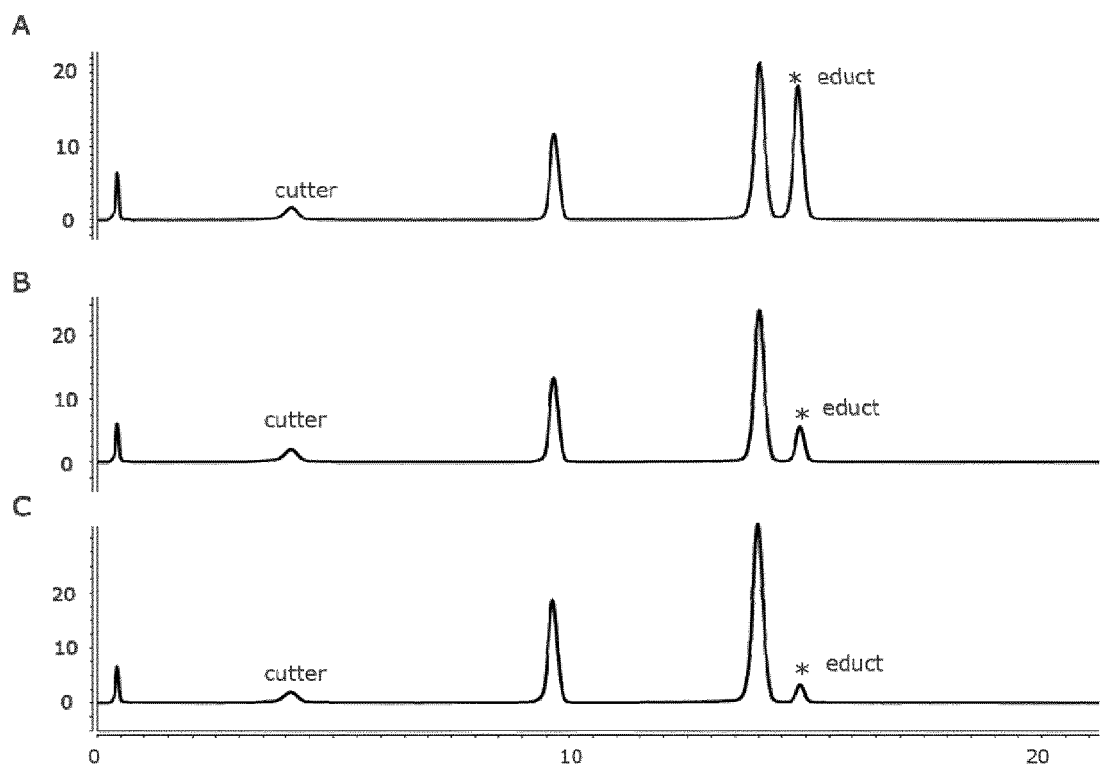
FIG. 16 Exemplary chromatograms showing digestion of the RNA using oligonucleotide conjugates using different cleavage temperatures, performed over 6 reaction cycles. A=25° C. cleavage temperature per cycle; B=35° C. cleavage temperature per cycle; C=45° C. cleavage temperature per cycle.
Figure 17:
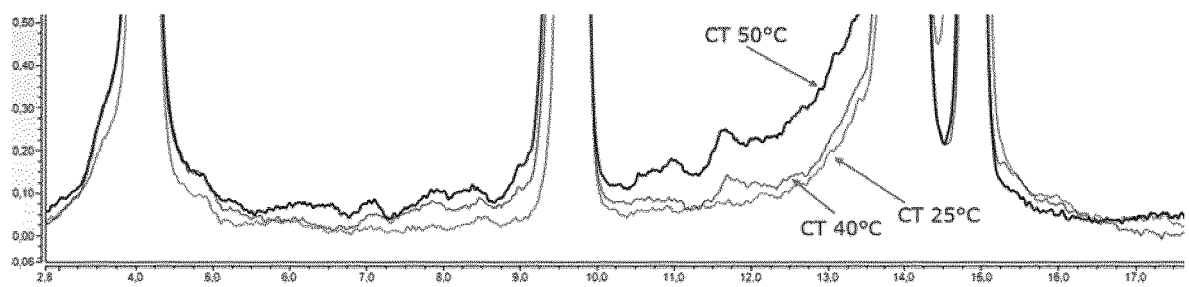
FIG. 17 Exemplary chromatograms showing thermal degradation of the target RNA at temperatures above 45° C.

Each cleavage product was subjected to analytical HPLC (exemplary chromatograms shown in FIG. 16), and the fraction of non-cleaved target RNA ("% educt") was measured to determine the respective conversion efficiencies (educt peak indicated by asterisks in FIG. 17). In addition, analytic HPLC was used to assess the effect of elevated temperature on target RNA degradation (analysis performed after 15 hours reaction time). Thermal degradation of the target RNA, which is not desirable in an analytical assay, was observed at temperatures above 45° C. (see FIG. 17). The results are summarized in Table 3. Moreover, thermal degradation of the oligonucleotide conjugate was not observed, as the peak area corresponding to oligonucleotide conjugate ("cutter" in FIG. 16) was constant, which indicates thermal stability of the oligonucleotide conjugate.

TABLE 3

Analysis of the target RNA peak to determine cleavage efficiency

| Non-cleaved target RNA (% educt peak) | Cleavage temperature | Conversion efficiency | Thermal degradation of target RNA | Thermal degradation of cutter |
|---|---|---|---|---|
| 34 | 25° C. | 66% | – | – |
| 22 | 30° C. | 78% | – | – |
| 12 | 35° C. | 88% | – | – |
| 8 | 40° C. | 92% | – | – |
| 5 | 45° C. | 95% | (+) | – |
| 10 | 50° C. | 90% | + | – |

The results of the experiments, summarized in Table 3, show that the conversion efficiency can be increased to almost 100% by increasing the cleavage temperature. Conversion efficiency refers to the amount of RNA molecule cleaved by the oligonucleotide conjugate. Thermal degradation of target RNA refers to unspecific RNA degradation. Depending on the stability of the RNA molecule to be analyzed, the composition of the oligonucleotide conjugate and the desired conversion efficiency, suitable denaturation, hybridization and cleavage temperatures can be selected. For example, LNA nucleotides require higher denaturation temperatures than DNA nucleotides, and can therefore operate at higher cleavage temperatures. In the present experiment, the optimal cleavage temperature was in a range of about 35° C. and 45° C.

The invention claimed is:

1. A method for analyzing an RNA molecule comprising the following steps:
   (i) providing an RNA molecule;
   (ii) providing at least one conjugate comprised of a chemical moiety with RNA cleaving activity and an oligonucleotide, wherein the sequence of said oligonucleotide is complementary to a target sequence of the RNA molecule;
   (iii) cleaving the RNA molecule provided in step (i) to obtain RNA fragments by contacting the RNA molecule with the at least one conjugate provided in step (ii) under conditions allowing the hybridization of said oligonucleotide to said target sequence and the cleavage of the RNA molecule; and
   (iv) determining a physical property of the RNA molecule by analyzing one or more of the RNA fragments obtained in step (iii),
   wherein the RNA molecule is an mRNA molecule and comprises a 5' cap structure and a PolyA sequence, wherein the conditions allowing the hybridization and the cleavage of the RNA molecule comprise one or more temperature shifts, wherein step (iii) of the method is as follows:
   (iii) cleaving the RNA molecule provided in step (i) to obtain RNA fragments by contacting the RNA molecule with the conjugate provided in step (ii) at a first temperature between about 5° C. and about 50° C., and at a second temperature between about 70° C. and about 90° C.; followed by a step of repeating the above step (iii) at least once, wherein this step precedes step (iv).

2. The method of claim 1, wherein cleaving the RNA molecule results in a 5' fragment, a 3' fragment and optionally one or more central fragments.

3. The method of claim 2, wherein the fragments are separated from each other before analyzing the one or more of the RNA fragments in step (iv).

4. The method of claim 3, wherein the fragments are separated by chromatography.

5. The method of claim 3, wherein the fragments are separated by electrophoresis.

6. The method of claim 3, wherein the 5' fragment is analyzed and/or the 3' fragment is analyzed.

7. The method of claim 6, wherein the 5' fragment is analyzed for one or more of
   (i) presence and/or integrity of the cap structure,
   (ii) methylation pattern; and
   (iii) orientation,
   by analytical HPLC and/or mass-spectrometry.

8. The method of claim 6, wherein the 5' fragment has a length of 1 to 100 nucleotides.

9. The method of claim 3, wherein the 3' fragment is analyzed.

10. The method of claim 9, wherein the 3' fragment comprises the sequence.

11. The method of claim 10, wherein the 3' fragment is analyzed for its nucleotide composition and/or length by complete hydrolysis of the 3' fragment followed by analysis of the individual nucleotides gained thereby by analytical HPLC and/or mass spectrometry.

12. The method of claim 10, wherein the 3' fragment has a length of 10 to 500 nucleotides.

13. The method of claim 6, wherein the RNA molecule is 300 to 9,000 nucleotides in length.

14. The method of claim 1, wherein the target sequence is present only once in the RNA molecule.

15. A method for analyzing a population of RNA molecules comprising the following steps:
   (i) providing a population of RNA molecules, wherein the population of RNA molecules comprises at least two different types of RNA molecules, wherein the different types of RNA molecules comprise an identical target sequence;
   (ii) providing a conjugate comprised of a chemical moiety with RNA cleaving activity and an oligonucleotide, wherein the sequence of said oligonucleotide is complementary to the target sequence;
   (iii) cleaving the population of RNA molecules provided in step (i) to obtain RNA fragments by contacting the RNA molecules with the conjugate provided in step (ii) under conditions allowing the hybridization of said oligonucleotide to said target sequence and the cleavage of the RNA molecules; and
   (iv) determining a physical property of the RNA molecules in the population by analyzing one or more of the RNA fragments obtained in step (iii),
   wherein the RNA molecules are mRNA molecules and each comprise a 5' cap structure and/or a PolyA sequence, wherein the conditions allowing the hybridization and the cleavage of the RNA molecules comprises one or more temperature shifts, wherein step (iii) of the method is as follows:
- (iii) cleaving the RNA molecules provided in step (i) to obtain RNA fragments by contacting the RNA molecules with the conjugates provided in step (ii) at a first temperature between about 5° C. and about 50° C., and at a second temperature between about 70° C. and about 90° C.; followed by a step of repeating the above step (iii) at least once, wherein this step precedes step (iv).

16. A method for analyzing a population of RNA molecules comprising the following steps:
- (i) providing a population of RNA molecules, wherein the population of RNA molecules comprises at least two different types of RNA molecules, wherein the different types of RNA molecules comprise different target sequences;
- (ii) providing at least two conjugates comprised of a chemical moiety with RNA cleaving activity and an oligonucleotide, wherein the oligonucleotide sequence of each conjugate is complementary to one of the different target sequences;
- (iii) cleaving the population of RNA molecules provided in step (i) to obtain RNA fragments by contacting the RNA molecules with the at least two conjugates provided in step (ii) under conditions allowing the hybridization of said oligonucleotides to said target sequences and the cleavage of the RNA molecules; and
- (iv) determining a physical property of the RNA molecules in the population by analyzing one or more of the RNA fragments obtained in step (iii), wherein the RNA molecules are mRNA molecules and each comprise a 5' cap structure and/or a PolyA sequence, wherein the conditions allowing the hybridization and the cleavage of the RNA molecules comprises one or more temperature shifts, wherein step (iii) of the method is as follows:
- (iii) cleaving the RNA molecules provided in step (i) to obtain RNA fragments by contacting the RNA molecules with the conjugates provided in step (ii) at a first temperature between about 5° C. and about 50° C., and at a second temperature between about 70° C. and about 90° C.; followed by a step of repeating the above step (iii) at least once, wherein this step precedes step (iv).

17. The method of claim 4, wherein the chromatography is HPLC.

18. The method of claim 4, wherein the chromatography is affinity chromatography.

19. The method of claim 6, wherein the sequence of said oligonucleotide is complementary to the target sequence of the RNA molecule over a length of 5-25 nucleotides.

20. The method of claim 12, wherein the wherein the 3' fragment has a length 50 to 250 nucleotides.

21. The method of claim 20, wherein the RNA molecule is 300 to 9,000 nucleotides in length.

22. The method of claim 21, wherein the sequence of said oligonucleotide is complementary to the target sequence of the RNA molecule over a length of 5-25 nucleotides.

23. The method of claim 22, wherein the 3' fragment is analyzed to determine PolyA length.

24. The method of claim 23, wherein the chemical moiety with RNA cleaving activity is tris (2-aminobenzimidazol), 1H-Imidazo[1,2-a]imidazole, 5H-Benzimidazo[1,2-a]benzimidazol, Hexahydro-2H-pyrimido[1,2a]pyrimidin-2,8-dion, 2-Aminobenzimidazol, Imidazo[1,2-a]benzimidazol, or 2-Aminochinolin.

25. The method of claim 24, wherein the chemical moiety with RNA cleaving activity is tris(2-aminobenzimidazole).

26. The method of claim 6, wherein the chemical moiety with RNA cleaving activity is tris(2-aminobenzimidazol), 1H-Imidazo[1,2-a]imidazole, 5H-Benzimidazo[1,2-a]benzimidazol, Hexahydro-2H-pyrimido[1,2a]pyrimidin-2,8-dion, 2-Aminobenzimidazol, Imidazo[1,2-a]benzimidazol, or 2-Aminochinolin.

27. The method of claim 26, wherein the chemical moiety with RNA cleaving activity is tris(2-aminobenzimidazole).

28. The method of claim 15, wherein the chemical moiety with RNA cleaving activity is tris(2-aminobenzimidazol), 1H-Imidazo[1,2-a]imidazole, 5H-Benzimidazo[1,2-a]benzimidazol, Hexahydro-2H-pyrimido[1,2a] pyrimidin-2,8-dion, 2-Aminobenzimidazol, Imidazo[1,2-a]benzimidazol, or 2-Aminochinolin.

29. The method of claim 28, wherein the chemical moiety with RNA cleaving activity is tris(2-aminobenzimidazole).

30. The method of claim 16, wherein the chemical moiety with RNA cleaving activity is tris(2-aminobenzimidazol), 1H-Imidazo[1,2-a]imidazole, 5H-Benzimidazo[1,2-a]benzimidazol, Hexahydro-2H-pyrimido[1,2a]pyrimidin-2,8-dion, 2-Aminobenzimidazol, Imidazo[1,2-a]benzimidazol, or 2-Aminochinolin.

31. The method of claim 30, wherein the chemical moiety with RNA cleaving activity is tris(2-aminobenzimidazole).

* * * * *

SEQUENCE LISTING

<160> NUMBER OF SEQ ID NOS: 11

<210> SEQ ID NO 1
<211> LENGTH: 646
<212> TYPE: RNA
<213> ORGANISM: Artificial Sequence
<220> FEATURE:
<223> OTHER INFORMATION: R4032

<400> SEQUENCE: 1

```
gggagaaagc uuaccauggg cgcccccacc cugccgccgg ccuggcagcc guuccucaag      60
gaccaccgca ucucgaccuu caagaacugg ccguuccugg agggcugcgc gugcaccccg     120
gagcggaugg ccgaggccgg cuucauccac ugccccaccg agaacgagcc ggaccuggcc     180
cagugcuucu ucugcuucaa ggagcuggag ggcugggagc cggacgacga cccgaucgag     240
gagcacaaga agcacagcag cggcugcgcc uuccugagcg ugaagaagca guucgaggag     300
```

```
cugacgcucg gggaguuccu gaagcuggac cgggagcggg ccaagaacaa gaucgcgaag    360
gagaccaaca acaagaagaa ggaguucgag gagaccgcca agaaggugcg gcgggccauc    420
gagcagcugg ccgccaugga cugaccacua guuauaagac ugacuagccc gaugggccuc    480
ccaacgggcc cuccuccccu ccuugcaccg agauuaauaa aaaaaaaaaa aaaaaaaaaa    540
aaaaaaaaaa aaaaaaaaaa aaaaaaaaaa aaaaaaaaaa aaugcauccc cccccccccc    600
cccccccccc ccccccccaa aggcucuuuu cagagccacc agaauu                   646
```

<210> SEQ ID NO 2
<211> LENGTH: 15
<212> TYPE: DNA
<213> ORGANISM: Artificial Sequence
<220> FEATURE:
<223> OTHER INFORMATION: 5'-cutter

<400> SEQUENCE: 2

```
cggcucccag ccctc                                                      15
```

<210> SEQ ID NO 3
<211> LENGTH: 15
<212> TYPE: DNA
<213> ORGANISM: Artificial Sequence
<220> FEATURE:
<223> OTHER INFORMATION: 5'-cutter

<400> SEQUENCE: 3

```
ggtaagcttt ctccc                                                      15
```

<210> SEQ ID NO 4
<211> LENGTH: 19
<212> TYPE: DNA
<213> ORGANISM: Artificial Sequence
<220> FEATURE:
<223> OTHER INFORMATION: 5'-cutter

<400> SEQUENCE: 4

```
ctcggtgcaa ggaggggag                                                  19
```

<210> SEQ ID NO 5
<211> LENGTH: 222
<212> TYPE: RNA
<213> ORGANISM: Artificial Sequence
<220> FEATURE:
<223> OTHER INFORMATION: R4032 expected 222 nt fragment

<400> SEQUENCE: 5

```
gggagaaagc uuaccauggg cgccccacc cugccgccgg ccuggcagcc guuccucaag      60
gaccaccgca ucucgaccuu caagaacugg ccguuccugg agggcugcgc gugcaccccg    120
gagcggaugg ccgaggccgg cuucauccac ugccccaccg agaacgagcc ggaccuggcc    180
cagugcuucu ucugcuucaa ggagcuggag ggcugggagc cg                      222
```

<210> SEQ ID NO 6
<211> LENGTH: 424
<212> TYPE: RNA
<213> ORGANISM: Artificial Sequence
<220> FEATURE:
<223> OTHER INFORMATION: R4032 expected 424 nt fragment

<400> SEQUENCE: 6

```
gacgacgacc cgaucgagga gcacaagaag cacagcagcg gcugcgccuu ccugagcgug     60
```

| | |
|---|---|
| aagaagcagu ucgaggagcu gacgcucggg gaguuccuga agcuggaccg ggagcgggcc | 120 |
| aagaacaaga ucgcgaagga gaccaacaac aagaagaagg aguucgagga gaccgccaag | 180 |
| aaggugcggc gggccaucga gcagcuggcc gccauggacu gaccacuagu uauaagacug | 240 |
| acuagcccga ugggcucccc aacgggcccu ccuccccucc uugcaccgag auuaauaaaa | 300 |
| aaaaaaaaaa aaaaaaaaaa aaaaaaaaaa aaaaaaaaaa aaaaaaaaaa aaaaaaaaaa | 360 |
| ugcaucccc cccccccccc cccccccccc cccccaaag gcucuuuuca gagccaccag | 420 |
| aauu | 424 |

<210> SEQ ID NO 7
<211> LENGTH: 512
<212> TYPE: RNA
<213> ORGANISM: Artificial Sequence
<220> FEATURE:
<223> OTHER INFORMATION: R4032 expected 512 nt fragment

<400> SEQUENCE: 7

| | |
|---|---|
| gggagaaagc uuaccauggg cgcccccacc cugccgccgg ccuggcagcc guuccucaag | 60 |
| gaccaccgca ucucgaccuu caagaacugg ccguuccugg agggcugcgc gugcaccccg | 120 |
| gagcggaugg ccgaggccgg cuucauccac ugccccaccg agaacgagcc ggaccuggcc | 180 |
| cagugcuucu ucugcuucaa ggagcuggag ggcugggagc cggacgacga cccgaucgag | 240 |
| gagcacaaga agcacagcag cggcugcgcc uuccugagcg ugaagaagca guucgaggag | 300 |
| cugacgcucg gggaguuccu gaagcuggac cgggagcggg ccaagaacaa gaucgcgaag | 360 |
| gagaccaaca acaagaagaa ggaguucgag gagaccgcca agaaggugcg gcgggccauc | 420 |
| gagcagcugg ccgccaugga cugaccacua guuauaagac ugacuagccc gaugggccuc | 480 |
| ccaacgggcc cucccccu ccuugcaccg ag | 512 |

<210> SEQ ID NO 8
<211> LENGTH: 134
<212> TYPE: RNA
<213> ORGANISM: Artificial Sequence
<220> FEATURE:
<223> OTHER INFORMATION: R4032 expected 134 nt fragment

<400> SEQUENCE: 8

| | |
|---|---|
| auuaauaaaa aaaaaaaaaa aaaaaaaaaa aaaaaaaaaa aaaaaaaaaa aaaaaaaaaa | 60 |
| aaaaaaaaaa ugcaucccc cccccccccc cccccccccc cccccaaag gcucuuuuca | 120 |
| gagccaccag aauu | 134 |

<210> SEQ ID NO 9
<211> LENGTH: 15
<212> TYPE: RNA
<213> ORGANISM: Artificial Sequence
<220> FEATURE:
<223> OTHER INFORMATION: Example target sequence

<400> SEQUENCE: 9

| | |
|---|---|
| gggagaaagc uuacc | 15 |

<210> SEQ ID NO 10
<211> LENGTH: 15
<212> TYPE: DNA
<213> ORGANISM: Artificial Sequence
<220> FEATURE:
<223> OTHER INFORMATION: Example complement target sequence

<400> SEQUENCE: 10

```
ggtaagctta ctccc                                                          15

<210> SEQ ID NO 11
<211> LENGTH: 15
<212> TYPE: RNA
<213> ORGANISM: Artificial Sequence
<220> FEATURE:
<223> OTHER INFORMATION: Example target sequence (w is a or u)
<220> FEATURE:
<221> NAME/KEY: misc_feature
<222> LOCATION: (7)..(7)
<223> OTHER INFORMATION: w is a or u

<400> SEQUENCE: 11
gggagawagc uuacc                                                          15
```